United States Patent [19]

Wang et al.

[11] Patent Number: 5,240,600

[45] Date of Patent: Aug. 31, 1993

[54] WATER AND WASTEWATER TREATMENT SYSTEM

[75] Inventors: Lawrence K. Wang, Latham, N.Y.; Lubomyr Kurylko, New Providence, N.J.; Mu H. S. Wang, Latham, N.Y.

[73] Assignee: International Environmental Systems, Inc., USA, Latham, N.Y.

[21] Appl. No.: 891,826

[22] Filed: Jun. 1, 1992

Related U.S. Application Data

[63] Continuation-in-part of Ser. No. 547,982, Jul. 3, 1990, Pat. No. 5,049,320, and a continuation-in-part of Ser. No. 708,777, May 29, 1991, Pat. No. 5,167,806.

[51] Int. Cl.$^5$ .............. C02F 3/22; C02F 3/26; C02F 9.00; B01F 3/04

[52] U.S. Cl. .............. 210/188; 210/195.1; 210/195.3; 210/197; 210/205; 210/258; 210/259; 210/260; 210/266; 210/295; 210/525; 210/615; 261/DIG. 75; 261/22.1; 210/624; 210/631; 210/707

[58] Field of Search .............. 210/188, 195.1, 195.3, 210/197, 205, 258, 259, 260, 266, 295, 621, 622, 624, 615, 525, 631, 707; 261/DIG. 75, 122.1

[56] References Cited

U.S. PATENT DOCUMENTS

| | | | |
|---|---|---|---|
| 1,667,265 | 7/1928 | Boving | 261/122 |
| 1,937,437 | 11/1933 | Piatt | 261/122 |
| 1,971,852 | 8/1934 | Goebels | 261/122 |
| 3,118,958 | 1/1964 | White | 261/122 |
| 3,400,818 | 9/1968 | Tarjan | 261/122 |
| 3,775,314 | 11/1973 | Beitzel et al. | 261/122 |
| 3,820,659 | 6/1974 | Parlette | 210/195 |
| 4,022,696 | 5/1977 | Krofta | 210/520 |
| 4,215,081 | 7/1980 | Brooks | 261/122 |
| 4,303,517 | 12/1981 | Love et al. | 210/208 |
| 4,333,829 | 6/1982 | Walther | 261/122 |
| 4,377,485 | 3/1983 | Krofta | 210/704 |
| 4,626,345 | 12/1986 | Krofta | 210/104 |
| 4,673,494 | 6/1987 | Krofta | 210/202 |
| 4,735,709 | 4/1988 | Zipperian | 261/122 |
| 4,838,434 | 6/1989 | Miller et al. | 261/122 |
| 4,931,175 | 6/1990 | Krofta | 210/221.2 |
| 5,049,320 | 9/1991 | Wang et al. | 261/122 |
| 5,064,531 | 11/1991 | Wang et al. | 210/221.2 |
| 5,068,031 | 11/1991 | Wang et al. | 210/221.2 |
| 5,069,783 | 12/1991 | Wang et al. | 210/221.2 |
| 5,078,861 | 1/1992 | Krofta | 210/744 |
| 5,084,165 | 1/1922 | Wang et al. | 210/96.1 |
| 5,167,806 | 12/1992 | Wang et al. | 210/188 |

FOREIGN PATENT DOCUMENTS 2106660 9/1971 Fed. Rep. of Germany ...... 261/122

OTHER PUBLICATIONS

The U.S. Dept. of Commerce, National Technical Information Service (NTIS) Report #PB-86-194198/AS, by L. K. Wang 15 pages, Nov. 1985.

Journal American Water Works Assocation, Jun. (1982) ny M. Krofta & L. W. Wang.

Water Treatment, vol. 6, pp. 127-146 (1991) by L. K. Wang.

*Primary Examiner*—Thomas M. Lithgow

[57] ABSTRACT

A biological treatment system involving the use of a gas dissolving pressure vessel, a pressurized water release assembly, a pretreatment chamber, a bioreactor, an open vessel, a post-treatment unit, a sludge removal unit, and a removable gas collection and purification unit for both wastewater treatment and air emission control is described. Gases are dissolved efficiently in a water inside the pressure vessel under controlled high pressure and high rotating velocity. Chemicals, or microorganisms, or both arm dosed to an influent water producing a pretreated water containing chemical flocs and biological flocs. The bioreactor comprising a hanging biological contactor is adopted when biochemical reaction is intended. A pressurized water containing supersaturated gases is produced in the pressure vessel and than depressurized through the pressurized water release assembly becoming a depressurized water containing micro bubbles. The pretreated water containing chemical flocs or biological flocs, or both are gently mixed and held together with the depressurized water containing micro bubbles in the open vessel for separation of chemical/biological flocs to the water surface, producing a purified effluent and a waste gas. A portion of the purified effluent is recycled for gas dissolution and micro bubbles production. When necessary, the waste gas is collected, purified and recycled to the pressure vessel or the bioreactor, or both for reuse.

23 Claims, 17 Drawing Sheets

WATER AND WASTEWATER TREATMENT SYSTEM

This application is a continuation-in-part of two applications; Ser. No. 07/547,982, filed Jul. 3, 1990 (now U.S. Pat. No. 5,049,320, issued Sep. 17, 1991) and Ser. No. 07/708,777, filed May 29, 1991 (now U.S. Pat. No. 5,167,806.

BACKGROUND OF THE INVENTION

1. Field of the Invention

The present invention relates to a method and an apparatus for dissolving gases into liquid phases under high pressure, (ranging from 2 to 7 atmospheric pressure), and high rotation velocity (2,500 rpm or higher) in an enclosed pressure vessel, and for subsequently releasing the pressurized liquid into an open vessel in order to generate extremely fine micro bubbles with a diameter less than 80 microns to facilitate dissolved gas flotation clarification, physical-chemical treatment and biological treatment. Conventional bubble separation, recarbonation, aeration, bio-oxidation, and ozonation technologies have a low efficiency for water and wastewater treatment and require a long retention time, and large reactors.

2. Description of Prior Art

Conventional adsorptive bubble separation and bio-oxidation processes involve the use of coarse air or oxygen bubbles which are inefficient and cause air pollution. The present invention represents a highly efficient alternative to conventional bubble separation liquid treatment methods such as conventional flotation, recarbonation, aeration, ozonation, chlorination, oxygenation, etc. The present invention is also an alternative to conventional biological oxidation (i.e. bio-oxidation) processes, such as conventional activated sludge, trickling filter, rotating biological contactors, biological tower, deep shaft process, biological fluidized bed, etc.

The adsorptive bubble separation process (including dissolved air flotation, dispersed air flotation, froth flotation, etc.) is a very effective technology for solid-liquid separation that has been in use outside the environmental engineering field for more than 50 years. Originally applied in the field of mining engineering, adsorptive bubble separation now provides the means for separation and/or concentration of 95 percent of the world's base metals and other mineral compounds. Recently, the adsorptive bubble separation process has become increasingly important in such diverse applications as the separation of algaes, seeds, or bacteria from biological reactors, removal of ink from repulped paper stock, recovery of wool fat from food processing streams, peas from pea pods, coal from slate, gluten from starch, oils from industrial effluents, and more recently in drinking water, cooling water, wastewater, and sludge treatments.

Adsorptive bubble separation process may be defined as the mass transfer of a solid from the body of a liquid, to the liquid surface by means of bubble attachment.

The solids are in dissolved, suspended and/or colloidal forms. The three basic mechanisms involved are bubble formation, bubble attachment and solids separation.

In general, the light weight suspended solids, such as fibers, activated sludge, free oil, chemical flocs, fats, etc., can be readily separated by the process in accordance with physical-chemical bubble attachment mechanism. The colloidal solids, soluble organics, soluble inorganics, and surface active substances are separated from the bulk liquid by the bubble separation process after they are converted from colloidal or soluble form into insoluble form (i.e. suspended solids) which can then be floated by bubbles.

Alternatively, the soluble surface active substances can be separated easily by an adsorptive bubble separation process in accordance with surface adsorption phenomena. Nonsurface active suspended solids, colloidal solids, soluble organics and soluble inorganics can all be converted into surface active substances. All surface active substances in either soluble form or insoluble form can be effectively floated by fine gas bubbles. Production of fine gas bubbles for bubble separation is a difficult engineering task. Conventional methods and apparatus for the production of fine bubbles is similar to an inefficient pressure spray can, which requires over 2 minutes of detention time and over 50 psig pressure. A high horsepower gas compressor for gas dissolving is a necessity for the conventional gas dissolving system.

Conventional recarbonation, aeration and ozonation processes all involve the use of inefficient porous plates or gas diffusers for the introduction of carbon dioxide gas, air or ozone gas into an aqueous phase under atmospheric pressure and low liquid gravimetric pressure. Since bubble sizes are big and non-uniform, many gas bubbles are not able to completely dissolve into the aqueous phase and one, therefore, wasted in the gas stream. In cases where ozone gas is used, the residual ozone gas in the gas stream may create an air pollution problem.

The present invention is an enclosed highly efficient pressure vessel, which are specifically designed to dissolve air, oxygen, nitrogen, carbon dioxide, ozone, other gases, or combinations thereof into a liquid stream, such as water, under high pressure (2 to 7 atmospheric pressure) and high rotation velocity (over 2,500 rpm). The swirling flow pattern, special nozzles, and porous gas dissolving means combine to achieve 100 percent gas dissolution in liquid and in turn eliminate the problem of a waste gas stream. The detention time needed for gas dissolving is reduced to a few seconds, therefore, the required size of the gas dissolving pressure vessel is significantly reduced. With the new system, a gas compressor becomes a supplemental means for the enhancement of gas dissolving and is no longer absolutely required. The present invention also relates an improved pressurized water release unit. The pressure vessel's effluent is discharged into a tank through the pressurized water release unit which is equipped with a stream-lined pressure reduction means for successful generation in the liquid of extremely fine gas bubbles with diameters less than 80 microns in an open vessel. Furthermore, the present invention relates newly improved water purification systems and wastewater treatment systems in which the gas dissolving-/releasing apparatus is fully utilized, and to which chemicals and/or microorganisms are dosed for chemical or biochemical reactions.

The method of dissolving volumetric gases into the liquid stream through a liquid-gas mixing vessel of porous gas diffusion tubes, nozzles, porous gas diffusion plates, or mechanical mixers is well known in the field of gas transfer. As the gas bubbles are released into the liquid phase through one of the liquid-gas mixing vessels, only a small fraction of gases becomes soluble in the liquid. The remaining large fraction of gases remains in gaseous form and forms large gas bubbles (over 250 microns in diameter) in the liquid because of gas diffusion created by shearing forces under mainly atmospheric pressure.

Accordingly, at a conventional activated sludge sewage treatment plant, the oxygen transfer efficiency from gas phase into liquid phase is less than 50 percent because diffused coarse air bubbles are supplied to the plant's aeration basins.

At a water softening plant, a swarm of diffused coarse carbon dioxide bubbles are supplied to the recarbonation process unit, again under atmospheric pressure, for precipitation of excessive soluble calcium ions, but only a small amount of carbon dioxide bubbles are chemically effective; the remaining carbon dioxide bubbles are wasted into the ambient air. The bubbles cause no short-term problems, but are contributing to undesirable global warming, the so-called greenhouse effect, in the long run.

Ozone gas is an excellent disinfectant as well as an oxidation agent which is commonly introduced into a liquid stream through a diffuser under nearly atmospheric pressure or negative pressure. This is the well known ozonation process. Any excessive ozone gas escaped from the liquid stream due to poor dissolution contributes to air pollution and also represents an unnecessary waste.

Diffused air flotation, dispersed air flotation, froth flotation, and foam separation are all conventional adsorptive bubble separation processes, in which coarse air bubbles (with a diameter much greater than 250 microns) are generated under nearly atmospheric pressure in one of the liquid-gas mixing vessels. A swarm of coarse air bubbles amounting to 400 percent of the liquid's volumetric flow creates turbulence in the liquid stream, and also provides a large air-to-liquid interface area that allows soluble surface active substances to be separated from the original liquid phase and form a foam or froth phase on the liquid surface.

Dissolved air flotation is an innovative adsorptive bubble separation process, in which extremely fine air bubbles (with diameter less than 80 microns) are required for separation of mainly insoluble suspended solids from the original liquid phase into a thickened scum phase on the liquid surface. The ratio of air volume to liquid volume is only about 1 to 3 percent.

In order to facilitate the aeration, recarbonation, ozonation and dissolved air flotation processes, generation of extremely fine gas bubbles is required, and can be effectively done under high pressure (2 to 7 atmospheric pressures) by the present invention.

Prior apparatus for a compressed air operation is described in U.S. Pat. No. 1,677,265 issued Jul. 17, 1928 to Jens Orten Boving, which relates to liquid pumps of the air-lift type, i.e. of the type in which the liquid is raised in an uptake or ascension pipe by means of compressed air admitted to the pipe at or near its lower end. This patent is particularly directed to an air-lift pump using compressed air still in gaseous form, rather than to a pressure vessel for air dissolution as is the case of the present application. However, it is important to illustrate the development of the air compression art leading to the present disclosure.

A prior apparatus for a compressed air operation applicable to aeration of activated sludge in a sewage treatment plant is described in U.S. Pat. No. 1,937,434 issued Nov. 28, 1933 to William M. Piatt. This patent is particularly directed to an improved compressed air diffusion using a liquid-gas mixing vessel of porous gas diffusion tubes and porous gas diffusion plates. Coarse air bubbles form an upward or horizontal swirling pattern in the liquid in an open tank under normal environmental pressure, and total vessel volume is the summation of liquid volume and gas bubble volume. The present invention utilizes a multi-stage pressure vessel for total dissolution of more than one type of gases (not for distribution and generation of air bubbles) under high pressure ranging 2 to 7 atm. The total pressure vessel volume of the present invention is equal to the liquid volume, and there is no gas flow out of the pressure vessel.

Apparatus for stirring up farinaceous materials in receptacles of any kind by compressed air or other compressed gas is shown in U.S. Pat. No. 1,971,852 issued Aug. 28, 1934, to Paul Goebels. This 1934 patent discloses an improved mixing device using both porous plates and porous tubes for mixing of substances in a container under normal atmospheric pressure of 1. The present invention, however, discloses an improved gas dissolution pressure vessel for soluble gas dissolution under high pressure and high rotation velocity, dissolving either compressed gas or non-compressed gas in liquid and eliminating gas bubbles after entering the pressure vessel. The Goebel's patent relates to an apparatus using compressed air or other gases for mixing purposes and the air or other gases becomes gas bubbles after passing through the porous diffusion media.

Still another apparatus for diffusing gases through porous media is shown in U.S. Pat. No. 3,118,958 issued Jan. 21, 1964, to John W. White. Specifically, White's patent relates to an improved apparatus for continuous production of cellular products which incorporates a micro-porous plate through which a gas is passed in uniform and correct amounts into the material to be formed, and the gas remains in gaseous form.

The present invention relates to an improved apparatus for continuous complete dissolution of gas into liquid under pressure, and the gas is no longer in gaseous form in the pressure vessel and continuous formation of micro bubbles with a pressurized water release assembly, instead of with porous media.

Still another apparatus for diffusing gases through porous media is shown in U.S. Pat. No. 3,400,818 issued Sep. 10, 1968 to Gusztav Tarjan. This patent discloses a froth flotation cell which is provided a static vortex inducer unit to which is fed a slurry of material to be separated and air to be dispersed therein, under normal environmental pressure forming a swarm of coarse bubbles. The present invention discloses a multi-stage pressure vessel in which more than one gases are dissolved in liquid, forming no bubbles, no foams, and no froths, in the pressure vessel, and also discloses a pressurized water release assembly for formation of micro bubbles by depressurization, not by gas diffusion.

The method and apparatus for mixing ozone with water in an ozonation process is disclosed by Stuart W. Beitzel et al in their U.S. Pat. No. 3,775,314 issued Nov. 27, 1973. Their patent discloses a new technology by which a whirling mass of fluid in a high pressure zone is injected into a body of water to be purified. The body of water has a pressure lower than that in the high pressure zone, thereby creating in the body of water a partial vacuum zone containing water and water vapor. Introducing ozone and/or oxygen gas at a pressure of less than about 15 psi into the partial vacuum zone, causes the formation of bubbles of the gas in the water. The present invention relates a pressure vessel which completely dissolves ozone and/or oxygen in highly pressurized water at 30-100 psi.

Many U.S. Patents (U.S. Pat. No. 3,820,659 issued to Parlette in June, 1974; U.S. Pat. No. 4,022,696 to Krofta in May, 1977; U.S. Pat. No. 4,303,517 issued to Love et al in December, 1981; U.S. Pat. No. 4,377,485 issued to Krofta tin March, 1983; U.S. Pat. No. 4,626,345 issued to Krofta in December, 1986; U.S. Pat. No. 4,673,494 issued to Krofta in June, 1987; No. 4,931,175 issued to Krofta in June 1990; U.S. Pat. No. 5,049,320 issued to Wang et al in Sep. 1991; U.S. Pat. No. 5,064,531 issued to Wang et al in Nov. 1991; U.S. Pat. No. 5,068,031 issued to Wang et al in November 1991; U.S. Pat. No. 5,069,783 issued to Wang et al in December 1991; and U.S. Pat. No. 5,084,165 issued to Wang et al in January 1992) disclose water and wastewater treatment apparatus using dissolved air flotation and filtration. While the dissolved air flotation process requires extremely fine air bubbles to increase its treatment efficiency, these patents disclose only improved flotation cells and filtration beds without enclosures (i.e. under normal pressure), but do not disclose any enclosed pressure vessel for dissolved air flotation and bio-oxidation process optimization. The present invention relates an improved apparatus and method for complete dissolution of various gases for specific optimization applications (ozone for ozonation, carbon dioxide for recarbonation, air for both aeration and dissolved air flotation, and oxygen for oxygenation) and physical-chemical and biological technologies for liquid treatment. In each application, the apparatus disclosed in the present invention produces extremely fine gas bubbles with diameters less than 80 microns, and produces an effluent meeting the effluent water quality standards.

An apparatus for dissolving a gas such as air into a liquid, under normal one atmospheric pressure, utilizing a submerged tube provided with a means for injecting the gas into the lower end thereof and for inletting liquid into the tube at various locations throughout the length thereof is disclosed in U.S. Pat. No. 4,215,081 issued Jul. 29, 1980 to Kirtland H. Brooks. The applications of Brook's patent and of the present invention are both for dissolving gas. However, the Brook's patent relates to a gas dissolving apparatus without any porous tubes or plates, and being operated under normal one atmospheric pressure for partial gas dissolution due to the fact that a majority of gas remains in gaseous form as bubbles. The present invention relates to an improved gas dissolving method and apparatus being operated under 2 to 7 atmospheric pressure for total gas dissolution, without forming gas bubbles in the pressure vessel.

An apparatus for removing foreign matter form the top surface of water, for use with aquaria, which comprises a discharge tube stationarily disposed in the aquarium and having its upper opening rim below the water surface, is disclosed in U.S. Pat. No. 4,333,829 issued Jun. 8, 1982 to Gerhard Walther. Specifically, Walther's patent relates to an apparatus using coarse bubbles generated by porous media for removing foreign matter under normal pressure. The pressure vessel disclosed in the present invention are used to dissolve gas, not under normal pressure and not for coarse bubble generation. The pressurized water release assembly disclosed in the present invention is for depressurization, and generation of extremely fine micro bubbles without the use of any porous media.

Another prior apparatus for froth flotating is described in U.S. Pat. No. 4,735,709 issued Apr. 5, 1988 to Donald E. Zipperian. This patent discloses a froth flotation system for separating a mineral fraction from an aqueous pulp containing a mixture of mineral and particles. It is accomplished by bubbling gas bubbles into the pulp in a open vessel under normal environmental pressure by two different means that diffuse compressed gas through porous micro diffusers for bubble generation and, in turn, for froth generation. The present invention relates to a pressure vessel in which gas is totally dissolved (i.e. not for bubble formation) under high pressure and over 2,500 rpm rotation velocity. Besides, no froth is involved in the present invention. Still another prior apparatus for froth flotation is described in U S. Pat. No. 4,838,434 issued Jun. 13, 1989 to Jan P. Miller et al. Their patent also discloses a froth flotation system in which porous plates are used for bubble generation and froth formation under normal environmental pressure, and in which a tangential inlet is wide open for influent flow coming in by gravity. The present invention relates to a pressure vessel for bubble elimination (i.e. total gas dissolution) under extremely high pressure and over 2,500 rpm rotation velocity, and also relates to a pressurized water release assembly, an open vessel, a chemical mixing chamber, sludge removal means, air emission means, feeders, pumps, etc. for liquid treatment. Theories, principles, design and specifications of oxygenation, ozonation, aeration, gas dispersion and bubbles generation are fully disclosed by Wang (U.S. NTIS No. PB86-194198/AS, Nov. 1985), Krofta and Wang (Journal American Water Works Association, Vol. 74, No. 6. P. 304–310, June, 1982) and Wang (Water Treatment, Vol. 6 No. 2, p. 127–146, April 1991). The oxygenation and ozonation system disclosed by Wang (U.S. NTIS No. PB83-127704-AS, Sep. 1982) relates to a hyperbaric reactor vessel into which both oxygen and ozone gases are pumped and diffused together through the same porous plate for simultaneous chemical reaction. The hyperbaric reactor vessel is 50 percent full of liquid, and 50 percent full of compressed gases. The gas transfer inside of said hyperbaric reactor vessel is accomplished by a recirculation pump which sprays the liquid into the compressed gas phase. The present invention is an improved oxygenation and ozonation system into which both oxygen and ozone gases are distributed separately into a pressure vessel for chemical reactions. The present inventors' pressure vessel is full of liquid in which gases are soluble. The total dissolution of the gas inside of the pressure vessel is accomplished by the improved nozzle assembly that gives over 2,500 rpm of rotation velocity. In addition, the present invention involves the use of separate means for dissolution of different gases at desired locations for desired chemical reactions. In an improved liquid treatment plant, air, ozone and carbon dioxide gases are dissolved in the present inventors' pressure vessel at different feed locations inside of the pressure vessel for individual chemical reactions; subsequently, the pressure vessel's effluent is discharged into a flotation clarification tank (i.e. an open vessel) through an improved pressurized water release means for generation of extremely fine oxygen, nitrogen, ozone, and carbon dioxide bubbles. For water purification, chemicals are dosed to the present invention for chemical reactions, coagulation, precipitation, flocs formation, clarification, disinfection, corrosion control, etc. For wastewater treatment, both microorganisms and chemicals are dosed to the present invention for nutrient supply, pH adjustment, bio-oxidation, nitrification, denitrification, phosphate removal, etc.

SUMMARY OF THE INVENTION

In accordance with the present invention, an improved liquid treatment method and apparatus for dissolving various gases and having chemical or biochemical reactions in a liquid stream under high pressure and high rotation velocity, releasing the pressurized liquid stream under reduced pressures in stages, and subsequently producing extremely fine bubbles under normal environmental pressure, comprises the following steps, facilities and alterations:

(a) pumping the liquid stream (i.e. water or other liquid solvent) through a gas injector loop and a liquid nozzle assembly into said apparatus comprising liquid inlets, liquid outlets, gas inlets, gas outlets, gas regulators, gas flow meters, pressure gauges, safety valves, a bleed-off point, a porous center gas dissolving tube, a wall-mounted gas dissolving plate assembly, a cylindrical pressure vessel, a pressurized water release assembly, a pretreatment chamber, an open vessel, a post treatment means, an air emission control means, and a sludge removal means, (b) providing chemicals and/or microorganisms into said pretreatment chamber of said apparatus, (c) feeding uncompressed gas into said gas injector loop, and feeding compressed gases into said pressure vessel, at pressure range of 2 to 7 atm and (d) operating said pressure vessel over 2,500 rpm rotating velocity, to conform to different gases and liquids, (e) dissolving more than one gases simultaneously and efficiently in said pressure vessel and/or in an open vessel under controlled pressure conditions for specific applications: ozonation, oxygenation, nitrogenation, chlorination, aeration, recarbonation (carbonation) bio-oxidation, nitrification, and dentrification, (f) releasing the pressurized effluent from the pressure vessel through a pressurized water release assembly into said open vessel under normal environmental pressure for generation of gas bubbles for various chemical and biochemical reactions, as well as for flotation of suspended contaminants, biological flocs and/or chemical flocs, (g) discharging the flotation clarified liquid as the final effluent or to a tertiary treatment unit for further treatment, (h) recycling a portion of the flotation clarified liquid to said pressure vessel, (i) collecting the floated sludge and the settled sludge by sludge removal means, and (j) collecting waste gases with a gas mover (vacuum pump) and an enclosure over said open vessel, purifying said waste gases with a demister and adsorber, and recycling the purified gases to said pressure vessel or said open vessel for reproduction of gas bubbles.

Still in accordance with the present invention, a complete liquid treatment system for water purification or wastewater treatment comprises in combination:

(a) biological treatment of said liquid (water or wastewater) in a bioreactor using microorganisms, aquatic plants, and aquatic animals, which are selected from a group comprising algae, bacteria, fungi, protozoans, rotifers, crustaceans, hyacinth plants, duckweeds, or combinations thereof, in the form of rooted growth, suspended growth, attached growth or combinations thereof, producing an effluent containing biological flocs, (b) chemical treatment of said liquid in said bio-reactor or a separate chemical reactor using chemical, producing an effluent containing chemical flocs, (c) separation of suspended solids (including biological flocs and chemical flocs) from said effluent containing said biological flocs and/or from said effluent containing chemical flocs using sedimentation clarification, and/or ultrafiltration/microfiltration, and producing a final purified effluent, and (d) collection of waste gases with a gas mover, and an enclosure over said reactors, and purification of said waste gases with a demister and adsorber assembly.

Still in accordance with the present invention, the water and wastewater treatment apparatus using the above treatment steps is in the shape of circular, rectangular, square, or combinations thereof.

BRIEF DESCRIPTION OF THE DRAWINGS

The present invention will become more fully understood from the detailed description given hereinbelow and the accompanying drawings which are given by way of illustration, and thus are not limitative of the present invention, and wherein.

DESCRIPTION OF THE PREFERRED EMBODIMENTS

FIG. 1 to FIG. 8B inclusive are a set of schematic diagrams of the present invention (a) when applied to dissolving gases (solutes, such as air, oxygen, nitrogen, ozone, carbon dioxide, etc.) into a pressurized liquid (a solvent, such as water) in a pressure vessel resulting super-saturated dissolved gas concentrations in a pressurized liquid; (b) when applied to releasing pressurized water through a pressure reduction means forming micro gas bubbles in an open vessel; and (c) when applied to liquid treatment giving high treatment efficiency. Many gaseous solutes, liquid solvents and flow patterns can also be applied to the present invention.

Figure 1:
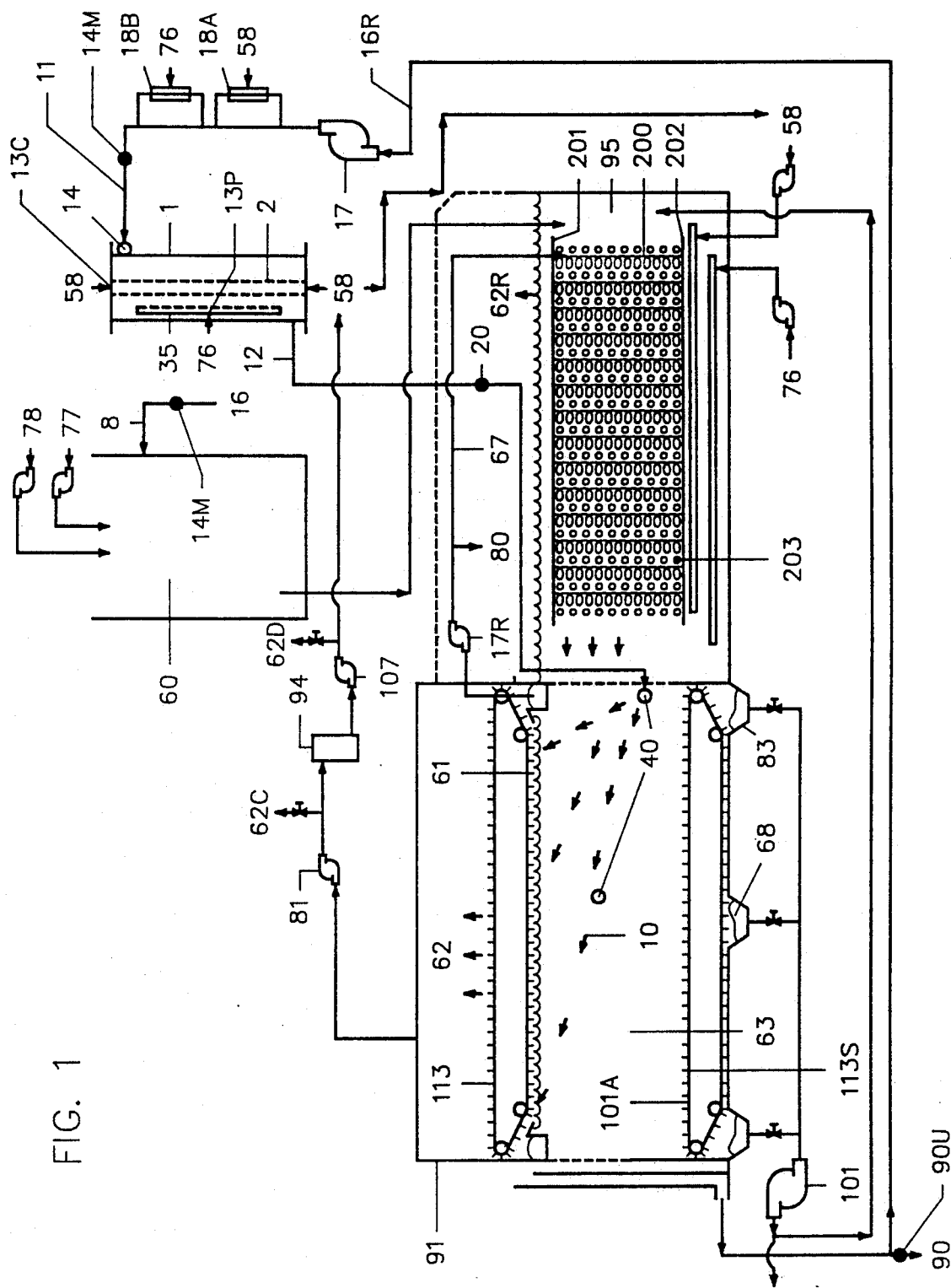
FIG. 1 shows the apparatus of a rectangular single-stage biochemical process system according to the present invention.
Figure 2:
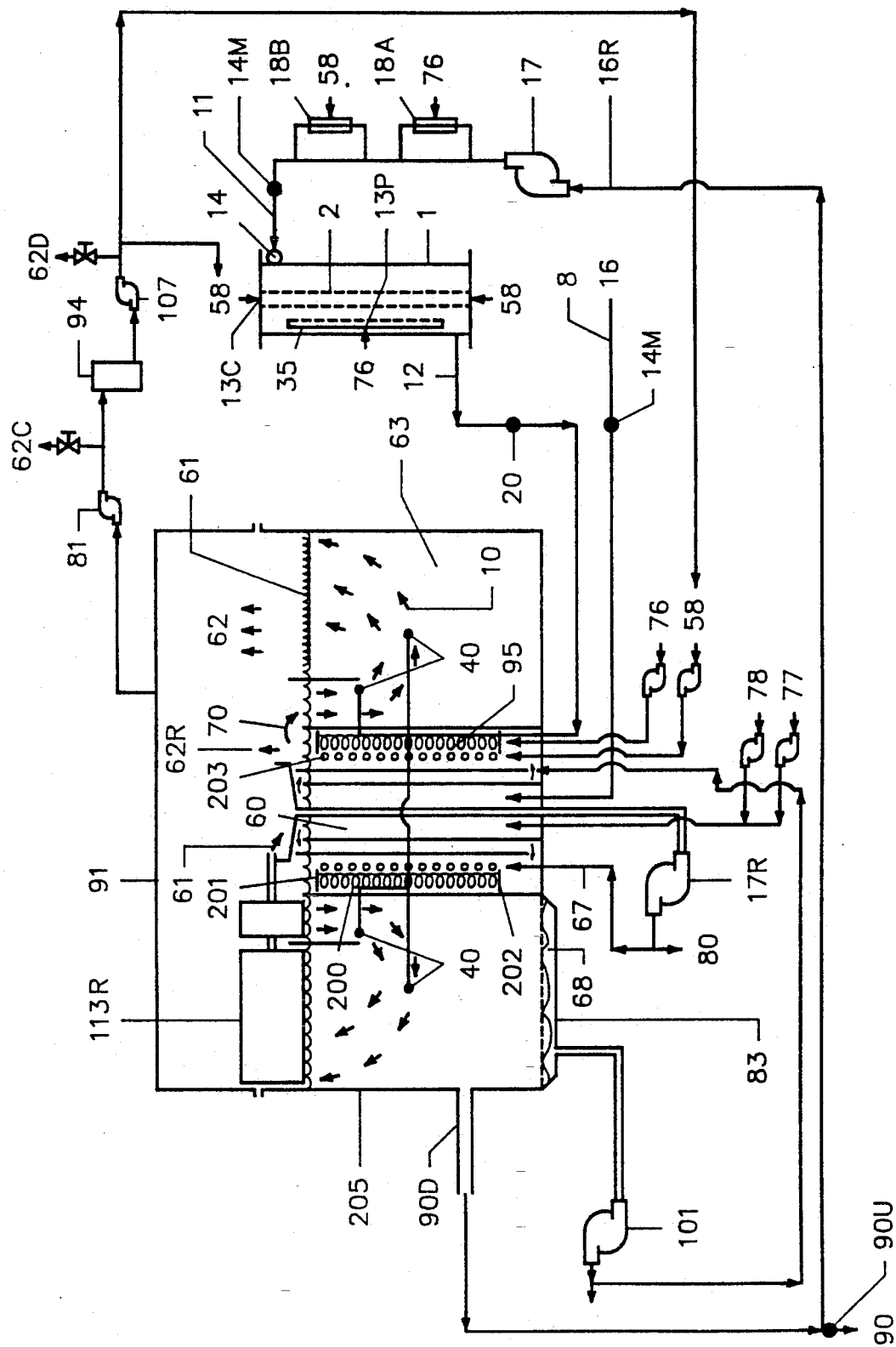
FIG. 2 shows the apparatus of a circular biochemical process system according to the present invention.

Referring to FIGS. 1 and 2, the gas dissolving apparatus is mainly equipped with an inlet comprising a nozzle assembly 14, a pump 17, a gas injector loop 18, a pressure vessel 1, a gas compressor 107, a liquid flow measuring means 14M, a liquid inlet section 11, a liquid outlet section 12, multiple gas inlets 13P and 13C, a porous center gas dissolving tube 2, and/or at least one wall-mounted gas dissolving plate assembly 35. The gas inlets 13P and 13C are for the wall-mounted porous gas dissolving plate assembly 35 and the porous center gas dissolving tube 2, respectively, inside said pressure vessel 1.

Other equipment of said gas dissolving apparatus not shown in the figures comprises a pressure gauge, a safety valve, a bleed-off point, and gas meters. Referring to FIGS. 1 and 2, the liquid stream 16R is pumped by a pressure pump 17 through two gas injector loops 18A and 18B, a liquid flow measuring means 14M and a nozzle assembly 14 into the pressure vessel 1, where the gaseous solutes are introduced to said porous center gas dissolving tube 2 and said wall-mounted gas dissolving plate assembly 35, and are subsequently dissolved into the liquid stream under high pressure 2-7 atm., and a rotation velocity over 2500 rpm surrounding said porous center gas dissolving tube 2. The liquid containing a high concentration of gaseous solutes, is discharged from said pressure vessel 1 from the liquid outlet section 12 to a pressurized water release assembly 40, shown in FIGS. 1 and 2.

The gas injectors 18A and 18B shown in FIGS. 1 and 2 introduce gases 58 and 76, respectively, into a liquid stream by suction (i.e. negative pressure) before entering the pressure vessel 1.

As the pressurized water from the liquid outlet section 12 of said pressure vessel 1 shown in FIGS. 1 and 2 goes through a pressure reduction valve 20 and a pressurized water release assembly 40, the high pressure is gradually reduced, so that extremely fine gas bubbles 10 with diameter less than 80 microns are formed in an open vessel 63 under controlled engineering conditions.

Referring to both FIGS. 1 and 2, more than one gases can be fed simultaneously into said pressure vessel 1 through gas inlets 13P & 13C and gas injector loops 18A and 18B for total gas dissolving and chemical reactions in the liquid under 2 to 7 atmospheric pressure. The remaining portions of FIGS. 1 and 2 are to be illustrated later.

Since more than one gases can be dissolved simultaneously and efficiently in said pressure vessel 1 under controlled pressure, and rotation velocity, and both chemicals and microorganisms can be dosed to said pressure vessel 1 and said open vessel 63 (see FIGS. 1-8B) for liquid treatment, the improved apparatus is compact, simple and cost-effective, and is applied to ozonation, chlorination, recarbonation, oxygenation, nitrogenation, aeration, and flotation processes, which are illustrated by the following examples.

EXAMPLE 1

Figure 3A:
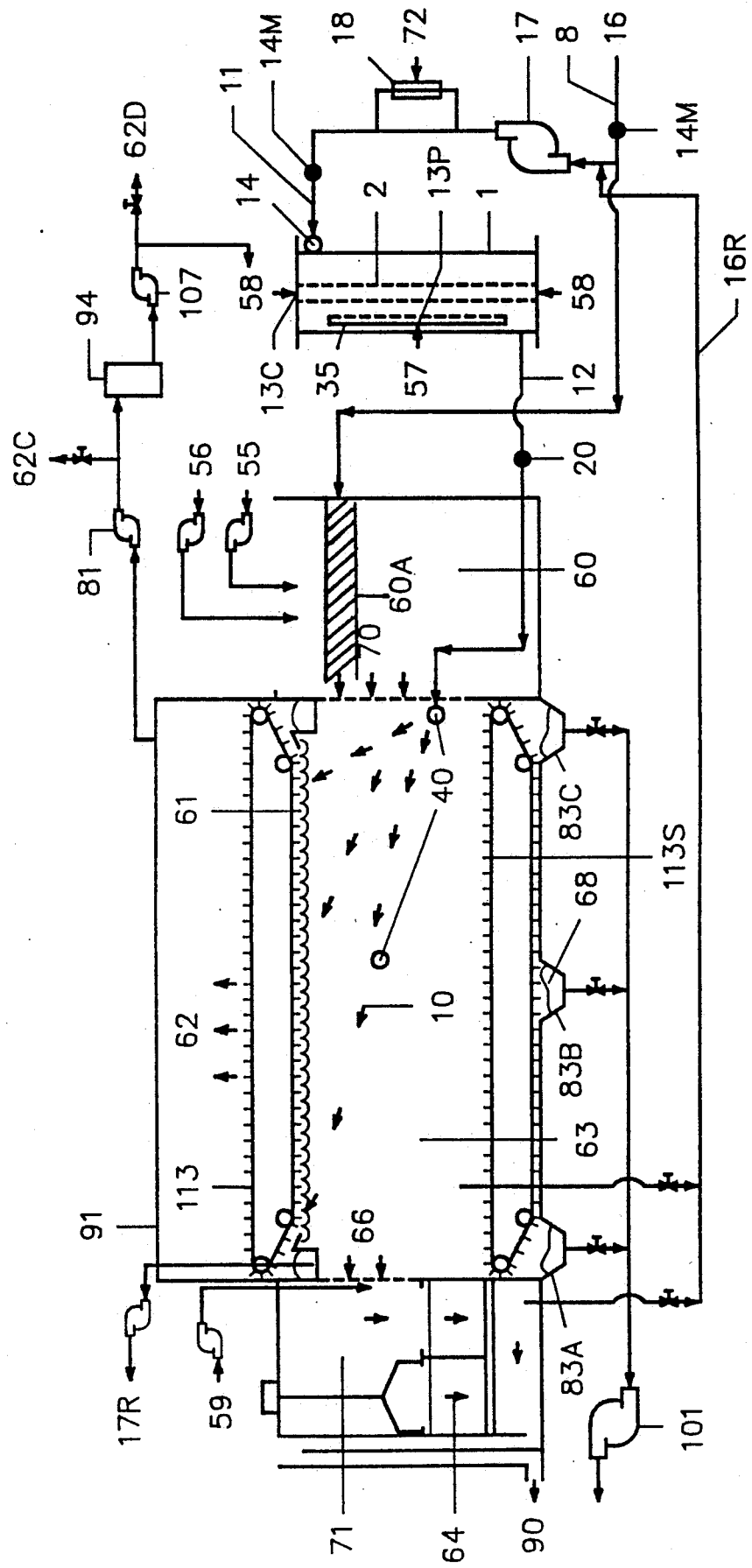
FIG. 3A shows the "single-stage hydroxide-soda ash flotation softening process" or a "single-stage chemical-physical process" that is disclosed in Example 1, and in which the mixing chamber, open vessel, stabilization means, and filtration means are all in rectangular or square shape.
Figure 3B:
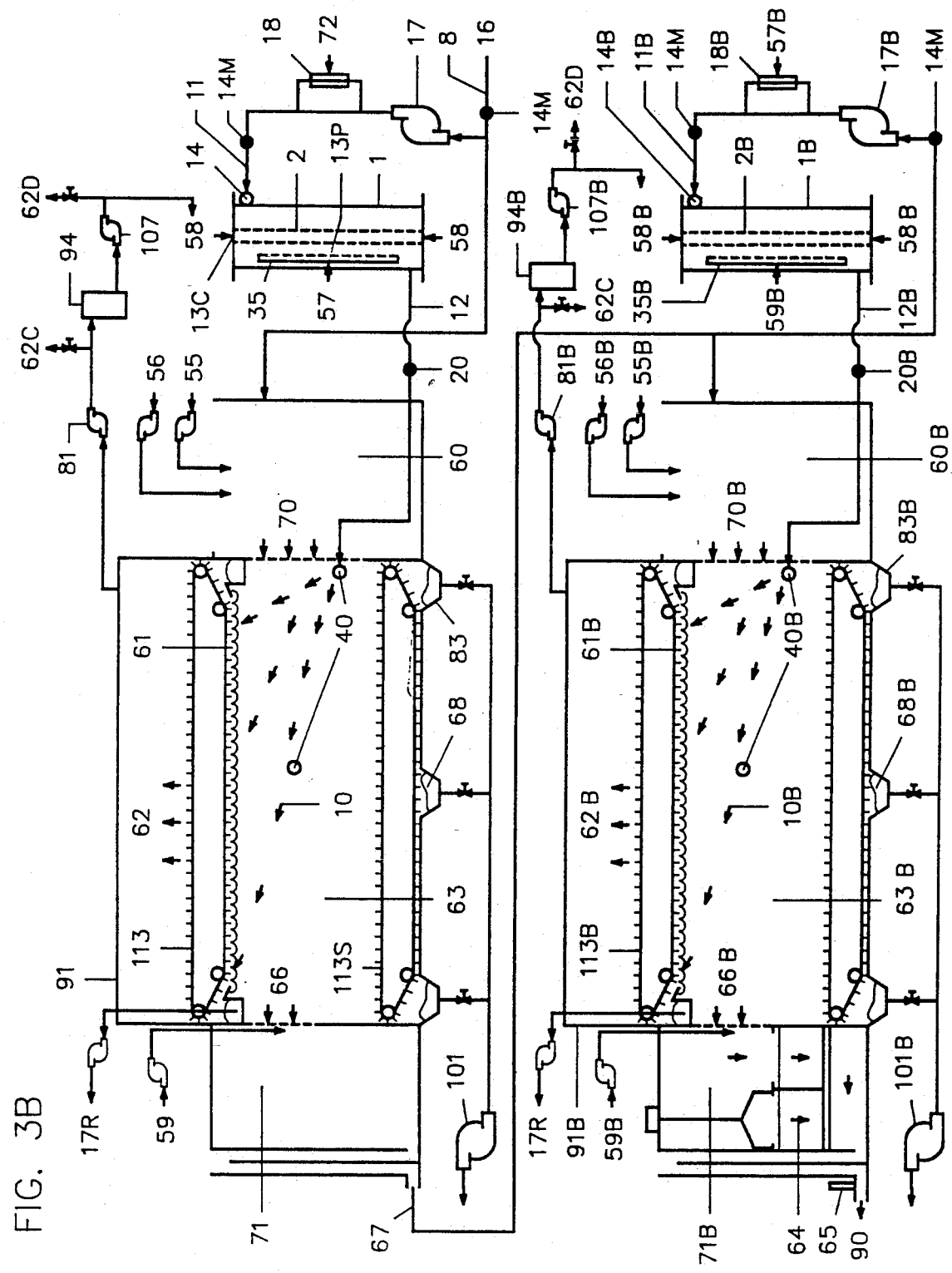
FIG. 3B shows the "two-stage hydroxide-soda ash flotation softening process" or a "two-stage chemical-physical process" that is disclosed in Example 1 and in which the mixing chamber, open vessel, stabilization means, and filtration means are all also in rectangular or square shape.
Figure 3C:
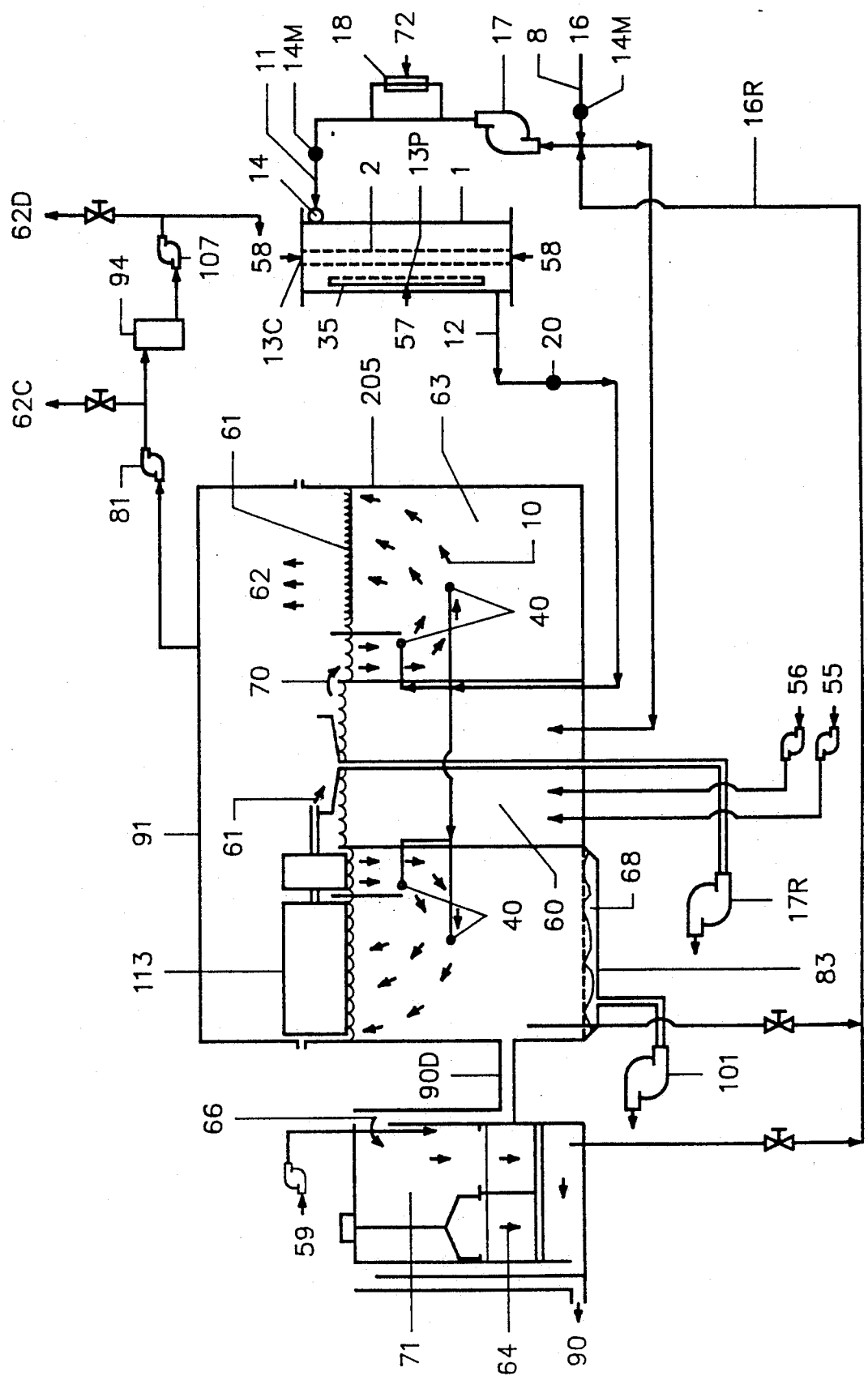
FIG. 3C shows the "single-stage hydroxide-soda ash flotation softening process" or a "single-stage chemical-physical process" (see Example 1), in which the mixing chamber and open vessel are in circular shape.
Figure 3D:
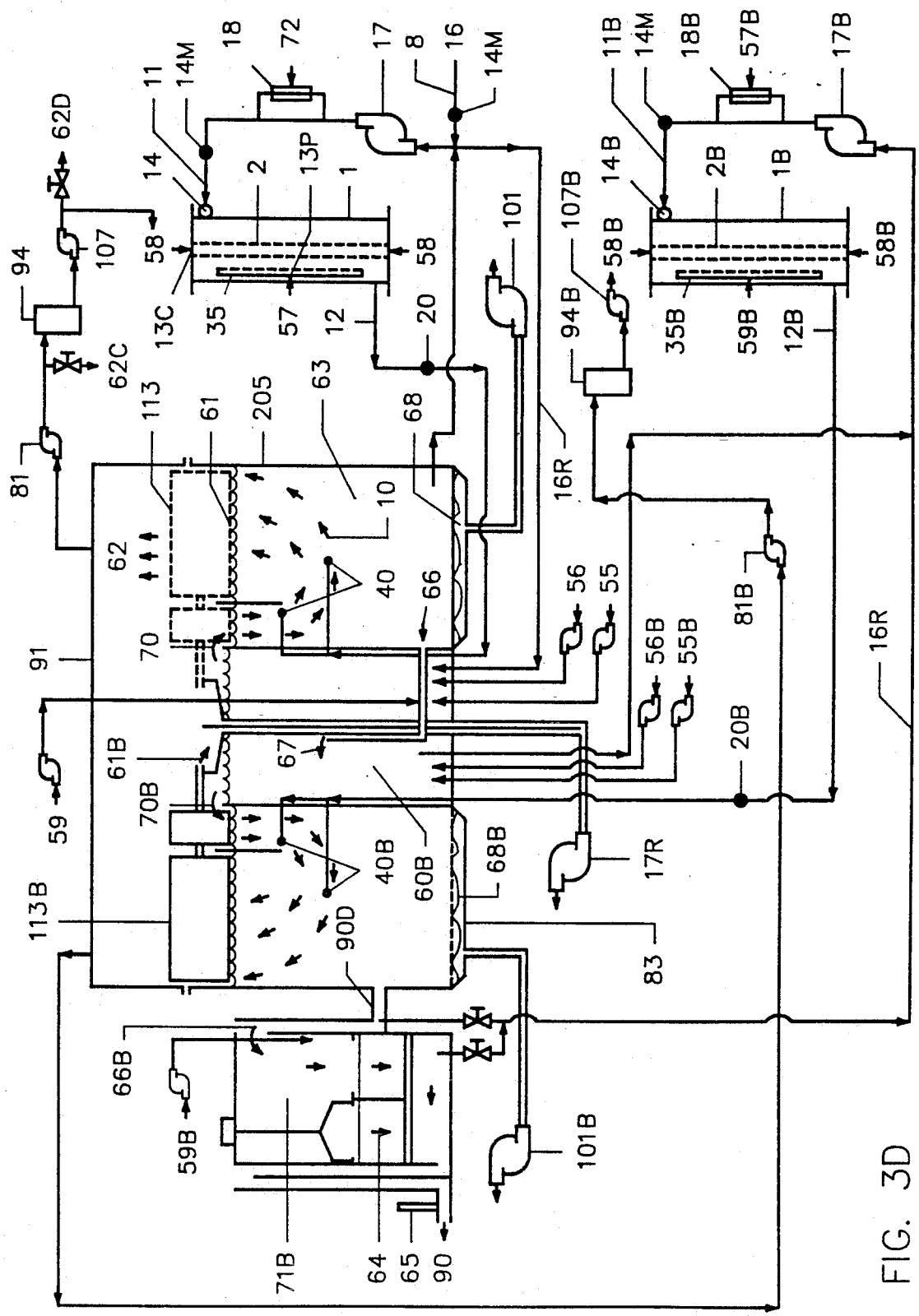
FIG. 3D shows the "two-stage hydroxide-soda ash flotation softening process" or a "two-stage chemical-physical process" (see Example 1) in which the mixing chamber and open vessel are also in circular shape.
Figure 3E:
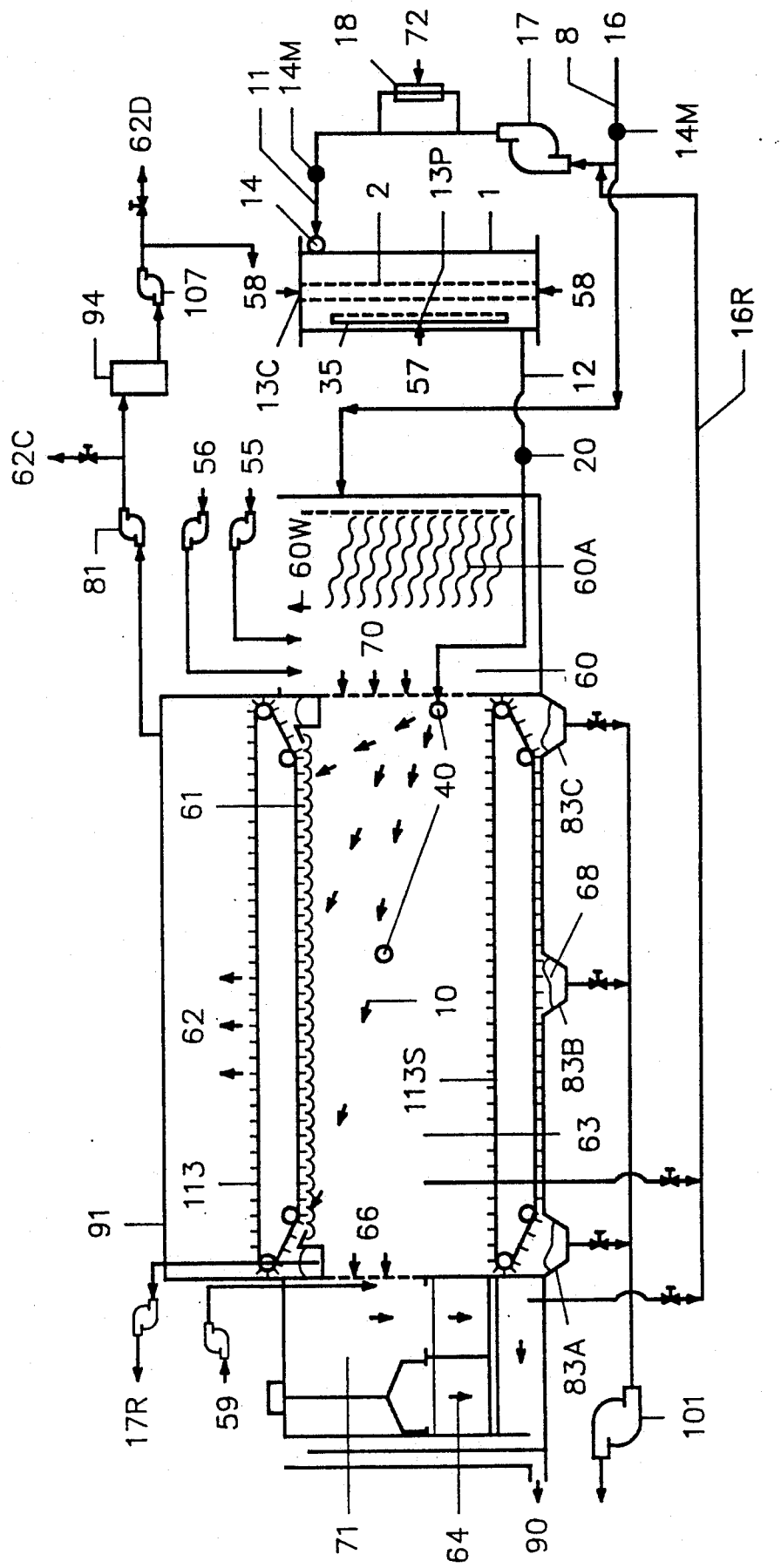
FIG. 3E shows an alternative "single-stage chemical-physical process" in which an oil-water separator is connected to the inlet pipe means for removing free oil from the influent liquid stream before said influent liquid stream reaching the mixing chamber and other treatment apparatus.

Several batches of an influent liquid stream from Massachusetts, having a composition which includes 9.8 mg/l of carbon dioxide, 175 mg/l of calcium hardness as $CaCO_3$, 42 mg/l of magnesium hardness as $CaCO_3$, 120 mg/l of bicarbonate alkalinity as $CaCO_3$, 2 NTU of turbidiy, 0.4 mg/l of iron, 0.06 mg/l of manganese, 0.5 mg/l of phosphate as P, 5 CU of color, neutral pH and 3/100 ml of total coliform bacteria have been adequately treated by a two-stage chemical-physical process system shown in FIGS. 3B and 3D. After treatment, the quality of product water meets the U.S. Federal and State Drinking Water Standards. In process operation, the influent liquid stream 16 is partially pumped by a pressure pump 17 through a gas injection loop 18 where chlorine 72 is dosed by suction. The mixture of chlorine 72 and liquid stream 16 flows through a nozzle assembly 14 and a liquid inlet 11, entering a first-stage pressure vessel 1 where compressed air (oxygen and nitrogen) 58 and ozone 57 are fed to said pressure vessel 1 through the gas inlets 13C and 13P, respectively. The unit processes involving the addition of ozone, chlorine and air are termed ozonation, chlorination and aeration, respectively. The ozone 57, chlorine 72 and air 58 gases are dissolved totally in said pressure vessel 1 under high pressure (2-7 atm.) and high rotation velocity (over 2,500 rpm). The effluent from said pressure vessel 1 containing super-saturated gases is released from a liquid outlet 12 into a pressurized water release assembly 40, and is mixed in a first-stage open vessel 63 with the by-passed liquid stream 70 which has been treated with chemicals 55 and 56 in a first-stage pretreatment chamber 60. Within said the first-stage open vessel 63, the micro gas bubbles 10 with less than 80 microns are formed in said first-stage open vessel 63 for ozonation, chlorination, aeration and flotation. Either ozonation or chlorination is a predisinfection step which kills all pathogenic microorganisms as well as total coliform bacteria.

Soluble divalent ferrous ions (Fe+2) and divalent manganese ions (Mn+2) are oxidized by the oxygen in the air bubbles, resulting trivalent ferric ions (Fe+3) and insoluble manganese dioxide precipitates. Ferric ions reacts with lime 55 as follows:

$$Fe_2(SO_4)_3 + 3Ca(OH)_2 = \underline{2Fe(OH)_3} + 3CaSO_4$$

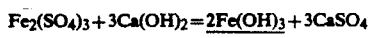

All chemical compounds with underlies are insoluble precipitates.

Calcium hardness and magnesium hardness in the forms of bicarbonate are precipitated as calcium carbonate or magnesium hydroxide by the addition of lime as chemical 55:

$$CO_2 + Ca(OH)_2 = \underline{CaCO_3} + H_2O$$

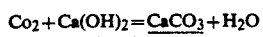

$$Ca(HCO_3)_2 + Ca(OH)_2 = \underline{2CaCO_3} + 2H_2O$$

$$Mg(HCO_3)_2 + 2Ca(OH)_2 = \underline{2CaCo_3} + \underline{Mg(OH)_2} + 2H_2O$$

Noncarbonate magnesium hardness is precipitated as magnesium hydroxide by the addition of lime 55, with the concurrent production of calcium sulfate, which, in turn, is precipitated as calcium carbonate by the addition of soda-ash 56. The reactions are illustrated as follows:

$$MgSO_4 + Ca(OH)_2 = \underline{Mg(OH)_2} + CaSO_4$$

$$CaSO_4 + Na_2CO_3 = \underline{CaCO_3} + Na_2SO_4$$

The existing noncarbonate calcium hardness is also precipitated by the addition of soda-ash 56 as illustrated by the above.

Alternatively, carbonate and noncarbonate hardness can be removed by the addition of caustic soda, instead of lime as chemical 55, as illustrated by the following:

$$CO_2 + 2NaOH = Na_2CO_3 + H_2O$$

$$Ca(HCO_3)_2 + 2NaOH = \underline{CaCO_3} + Na_2CO_3 + 2H_2O$$

$$Mg(HCC_3)_2 + 4NaOH = \underline{Mg(OH)_2} + 2Na_2CO_3 + 2H_2O$$

$$MgSO_4 + 2NaOH = \underline{Mg(OH)_2} + Na_2SO_4$$

Now the insoluble magnesium hydroxide $Mg(OH)_2$, calcium carbonate $CaCO_3$, ferric hydroxide $Fe(OH)_3$, and manganese dioxide $MnO_2$ agglomerate together as insoluble chemical flocs in said first-stage open vessel 63 in FIGS. 3B and 3D, and further agglomerate with other colloidal contaminants, such as turbidity, forming bigger flocs to be floated by the micro bubbles released from the pressurized water release assembly 40. The floated sludge 61 is skimmed or scooped off from the water surface of said first-stage open vessel 63, where the waste gases 62 from bubbles are also released. Small amount of settled silts 68 is collected from the bottom of said first-stage open vessel 63. The softened water 66 is usually saturated with about 30 mg/l of soluble calcium carbonate at the high pH values ranging 10–11; therefore, the softened water 66 must be stabilized by stabilization 71, with carbon dioxide 59 or acids to be added to the softened water 66 as follows:

$$CaCO_3 + CO_2 + H_2O\ Ca(HCO_3)_2$$

$$2CaCO_3 + H_2SO_4 = Ca(HCO_3)_2 + CaSO_4$$

$$2CaCO_3 + 2HCl = Ca(HCO_3)_2 + CaCl_2$$

The use of carbon dioxide for stabilization is usually termed "recarbonation" or "carbonation".

After the softened water 66 from said first-stage open vessel 63 is stabilized by stabilization 71, the residual pH is about 8.5. A portion of the stabilized water 67 is by-passed by pump 17B to filtration 64, and disinfection 65 for further treatment, before being discharged as a product water 90. This is a improved single-stage treatment (FIGS. 3A and 3C). Stabilization 71 immediately ahead of the filtration 64 is used to prevent scaling of the filter media.

The remaining portion of the stabilized water 67 from said first-stage stabilization 71 is further treated by a second-stage apparatus shown in FIGS. 3B and 3D involving the additional use of all facilities with "B" designations. The stabilized water 67 is pumped by a pump 17B to a second-stage pressure vessel 1B, a pressurized water release assembly 40B, and an open vessel 63B where the by-passed water 70B containing chemicals 55B and 56B is mixed together, where micro gas bubbles 10 are also formed for flotation, and from where the floating scum 61B are skimmed off, the settled silts 68B are removed and the mixed gases 62B are escaped. In the two-stage chemical-physical system shown in FIGS. 3B and 3D addition of soda ash 56 to the first-stage pretreatment chamber 60, ozone 57B to the gas injector 18B, and lime 55B to the second-stage pretreatment chamber 60B are optional and de-emphasized; however, addition of both carbon dioxide 59B and air 58B to said second-stage pressure vessel 1B and addition of soda ash 56B to said second-stage pretreatment chamber 60B is emphasized and enhanced. The softened water 66B from said second-stage open vessel 63B is pumped by the pump 17B to the second-stage stabilization 71B (with carbon dioxide 59B or acids, not shown), filtration 64 and disinfection 65 before being discharged as the product water 90. The present invention shown in FIGS. 3B and 3D is a "Two-Stage Hydroxide-Soda Ash Flotation Softening Process," or simply a "Two-Stage Chemical-Physical Process."

EXAMPLE 2

Several batches of groundwater from Arkansas have been spiked with heavy metal and phosphate contaminants to have a composition including 10 mg/l of ferrous iron, 0.9 mg/l of divalent manganese, 75 NTU of turbidity, 312 mg/l of total hardness as $CaCO_3$, 420 CU of color, 8 mg/l of phosphate as P, 3/100 ml of total coliforms, 3.5 mg/l of Ni, 0.2 mg/l of Cr, 0.002 mg/l of Hg, 0.2 mg/l of Cd, 1.5 mg/l of Cu, 6.1 mg/l of Zn, 1.2 mg/l of Pb, 0.1 mg/l of Ag, 0.01 mg/l of Se, 0.8 mg/l of Ba, 0.01 mg/l of As, and 6.7 units of pH. The spiked groundwater which is an influent liquid stream has been successfully treated by a Single-Stage chemical-physical system shown in FIGS. 4A, 4B, 4C, 4D, and 4E. During treatment, the influent liquid stream 16 is fed by either gravity or pumping to a pretreatment chamber 60 where lime 55 ($Ca(OH)_2$ or CaO), sodium aluminate 73 ($NaAlO_2$), potassium permanganate 75 ($KMnO_4$) and polymer 74 are added and flocculated at pH about 11. The effluents from said pretreatment chamber 60 and from the pressurized water release assembly 40 meet in an open vessel 63 where the micro gas bubbles of ozone 57 ($O_3$) and air 58 ($N_2$ & $O_2$) with diameter less than 80 microns are formed.

The following are the chemical reactions occurring in said pretreatment chamber 60 and said open vessel 63.

$$NaAlO_2 + 2H_2O = NaOH + \underline{Al(OH)_3}$$

$$CO_2 + 2NaOH = Na_2CO_3 + H_2O$$

$$Ca(HCO_3)_2 + 2NaOH = \underline{CaCO_3} + Na_2CO_3 + 2H_2O$$

-continued $Mg(HCO_3)_2 + 4NaOH = Mg(OH)_2 + 2Na_2CO_3 + 2H_2O$ $MgSO_4 + NaOH = Mg(OH)_2 + Na_2SO_4$ $CaO + H_2O = Ca(OH)_2$ $CO_2 + Ca(OH)_2 = CaCO_3 + H_2O$ $Ca(HCO_3)_2 + Ca(OH)_2 = 2CaCO_3 + 2H_2O$ $Mg(HCO_3)_2 + 2Ca(OH)_2 = 2CaCO_3 + Mg(OH)_2 + 2H_2O$ $MgSO_4 + Ca(OH)_2 = Mg(OH)_2 + CaSO_4$ $CaSO_4 + Na_2CO_3 = CaCO_3 + Na_2SO_4$ $2FeSO_4 + O_3 + Na_2SO_4 + H_2O = Fe_2(SO_4)_3 + O_2 + 2NaOH$ $2KMnO_4 + 2FeSO_4 + 2H_2SO_4 = Fe_2(SO_4)_3 + K_2SO_4 + 2MnO_2 + 2H_2O + O_2$ $Fe_2(SO_4)_3 + 6H_2O = 2 Fe(OH)_3 + 3H_2SO_4$ $2 Al(OH)_3 + 3H_2SO_4 = Al_2(SO_4)_3 + 6H_2O$ $Al_2(SO_4)_3 + 2Na_3PO_4 = 2AlPO_4 + 3Na_2SO_4$ $2O_3 + C (Organics) = CO_2 + 2O_2$ $MnSO_4 + O_3 + H_2O = MnO_2 + O_2 + H_2SO_4$ $NiCl_2 + Ca(OH)_2 = Ni(OH)_2 + CaCl_2$ $NiSO_4 + Ca(OH)_2 = Ni(OH)_2 + CaSO_4$ $Cr_2(SO_4)_3 + 3Ca(OH)_2 = 2Cr(OH)_3 + 3 CaSO_4$ $Cd(NO_3)_2 + Ca(OH)_2 = Ca(NO_3)_2 + Cd(OH)_2$ $CuSO_4 + Ca(OH)_2 = CaSO_4 + Cu(OH)_2$ $ZnCl_2 + Ca(OH)_2 = Zn(OH)_2 + CaCl_2$ $Pb(NO_3)_2 + Ca(OH)_2 = Ca(NO_3)_2 + Pb(OH)_2$ $2 AgNO_3 + Ca(OH)_2 = 2 Ag(OH) + Ca(NO_3)_2$ Specifically sodium aluminate 73 ($NaAlO_2$) produces alum floc $Al(OH)_3$, and sodium hydroxide NaOH, which is turn reacts with calcium hardness $Ca(HCO_3)_2$ and magnesium hardnesses $Mg(HCO_3)_2$ & $MgSO_4$ to form insoluble flocs $CaCO_3$ and $Mg(OH)_2$.

The added lime 55 ($Ca(OH)_2$ or CaO) reacts with the $CO_2$, $Ca(HCO_3)_2$, $Mg(HCO_3)_2$ and $MgSO_4$, also producing insoluble $CaCO_3$ and $Mg(OH)_2$. $Na_2CO_3$ produced previously from NaOH reactions reacts with permanent hardness $CaSO_4$ producing insoluble $CaCO_3$.

The added ozone 57 ($O_3$) oxidizes $FeSO_4$, organics and $MnSO_4$ producing insoluble $Fe(OH)_3$, $MnO_2$ and $AlPO_4$ in conjunction with other intermediate chemical products.

The added potassium permanganate 75 ($KMnO_4$) is another oxidizing agent suitable for removal of ferrous sulfate $FeSO_4$, resulting insoluble $Fe(OH)_3$.

Toxic heavy metals $NiCl_2$, $NiSO_4$, $Cr_2(SO_4)_3$, $Cd(NO_3)_2$, $CuSO_4$, $ZnCl_2$, $Pb(NO_3)_2$, $AgNO_3$, etc. in the influent liquid stream 16 can all be precipitated by lime 55 producing their respective insoluble hydroxide flocs $Ni(OH)_2$, $Cr(OH)_3$, $Cd(OH)_2$, $Cu(OH)_2$, $Zn(OH)_2$, $Pb(OH)_2$ and $Ag(OH)$. All insoluble chemical flocs further agglomerate with turbidity and color colloids forming bigger insoluble complex flocs.

The micro gas bubbles 10 (FIGS. 4A-4E) in said open vessel 63 float all insoluble chemical flocs as well as insoluble complex flocs to the water surface in said open vessel 63 and escape as the waste gas 62. The floated scums 61 are skimmed off or scooped off from the water surface of said open vessel 63. The heavy settled silts 68 are pumped out periodically from the water bottom of said open vessel 63.

The clarified open vessel effluent 66 flows to a stabilization unit 71 where carbon dioxide 59, is dosed for recarbonation, pH adjustment (to 8 to 8.5) and scale prevention. The stabilized effluent 67 flows to a filtration unit 64 and then to a disinfection unit 65 for final polishing before being discharged as the product water 90 which meets the U.S. Federal Drinking Water Standards.

A portion of said product water 90 or the effluent from said filtration 64, or the effluent from said open vessel 63, is recycled by a pump 17 to a pressure vessel through a gas injection loop 18 where ozone 57 is dosed by suction. Air 58 and more ozone 57 are added to said pressure vessel 1 for complete dissolution of all gases in the pressurized water which in turn flows to the pressurized water release assembly 40 for subsequent production of micro gas bubbles 10 (with diameter less than 80 microns) in said open vessel 63, thus completing a cycle.

EXAMPLE 3

Figure 5A:
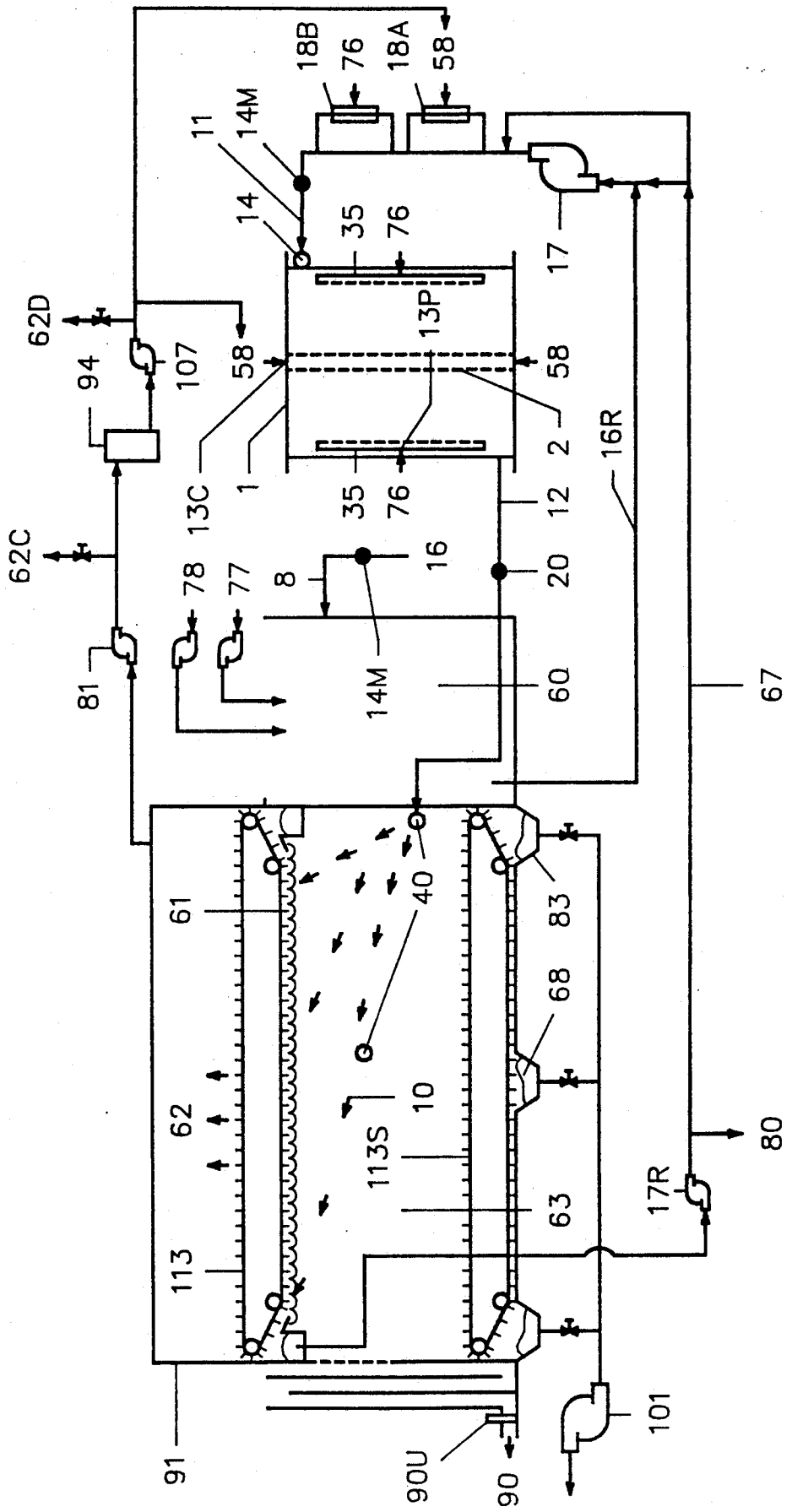
FIG. 5A is the rectangular or square biochemical process apparatus of this invention, which is described in Example 3.

Several batches of a primary effluent from New Jersey, USA, have been mixed together for treatment by a single-state biochemical process shown in FIG. 5A. The composition of the primary effluent which is an influent liquid stream 16 are: 2,600,000/100 ml of total coliforms, 750 CU of color, 96 NTU of turbidity, 6.8 units of pH, 130 mg/l of alkalinity as $CaCO_3$, 15 mg/l of ammonia-N, 12.8 mg/l of phosphate-P, 310 mg/l of 5-day BOD, and 320 mg/l of TSS. Over 90% reductions of total coliforms, color, turbidity, phosphate, BOD, and TSS are accomplished consistently after treatment. In operation, the influent liquid stream 16 is fed to a pretreatment chamber 60 where nutrients 77 and microorganisms 78 required for biochemical reactions are added. The influent liquid stream 16 now containing enough nutrients is pumped by a pump 17 to a pressure vessel 1 to where air 58 and pure oxygen 76 are fed through gas inlets 13C and 13P, respectively. Additional air 58 and pure oxygen 76 are fed to gas injectors 18B and 18A, respectively, before the liquid stream 16 and/or 16R enters said pressure vessel 1 through a nozzle assembly 14. The microorganism concentration in said pressure vessel 1 is maintained at 15,000 to 35,000 mg/l at 80–100 psig of pressure and over 45 mg/l of supersaturated dissolved oxygen (DO).

In accordance with the famous L. K. Wang & D. C. Elmore Equations in below, the higher the pressure (P) inside said pressure vessel 1, the higher the DO concentration in water.

As a typical example, when water temperature (T)=29 degree C, chloride concentration (CL)=5 g/l, and environmental barometric pressure (P)=700 mm Hg, dissolved oxygen concentration ($DO_{ssp}$) is only 6.7 mg/l for supporting a conventional activated sludge process system, in which the microorganisms concentration ranges from 1,500 to 5,000 mg/l for bioxidation. However, at 90 psig, (P=4654.35 mm Hg) inside said pressure vessel 1 of this invention, the super-saturated dissolved oxygen concentration ($DO_{ssp}$) becomes 46.25 mg/l which supports extremely high concentration of microorganisms, in turn, increases the treatment efficiency, and reduces the treatment detention time.

Under such conditions, the organic contaminants $C_aH_bO_cN_3P_eS_f$ are consumed by the microorganisms rapidly in accordance with the following biochemical reactions:

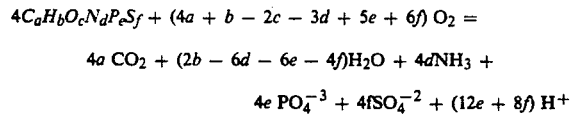

in which the end product $NH_3$ can be further oxidized to $NO_2-$ and/or $NO_3-$. The micro-organisms grow inside said pressure vessel 1 in accordance with the following two equations approximately:

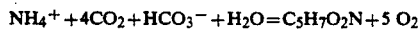

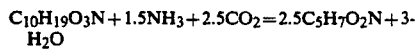

in which $C_5H_7O_2N$ is the empirical formula of bacteria cell and $C_{10}H_{19}O_3N$ is the empirical composition of domestic sewage.

Sometimes the DO is sufficient to reach the microorganisms, but there is no external carbonaceous source available for cell assimilation because of low organic loading. Some microorganisms will enter into an "endogenous oxygen respiration" inside said pressure vessel 1:

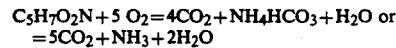

After a sufficient detention time inside said pressure vessel 1 is over, domestic sewage $C_{10}H_{19}O_3N$ or any other organic pollutants $C_aH_bO_cN_dP_eS_f$ are consumed by the existing microorganisms in the presence of supersaturated DO, and more microorganisms $C_5H_7O_2N$ and waste gases, such as $CO_2$ and trace of $NH_3$ are produced inside said pressure vessel 1, but in total dissolution forms. The effluent of pressure vessel passes through a pressurized water release assembly 40, entering an open vessel 63 where the insoluble suspended microorganisms $C_5H_7O_2N$ are floated to the water surface by a swarm of micro bubbles (with diameter less than 80 microns) coming from the pressurized water release assembly 40. The floated sludges are scooped off, and pumped away by a pump 17R. A portion of the floated sludge transported by said pump 17R is discharged as waste sludge 80, and the remaining portion of said, floating scum containing mainly microorganisms is recycled back to the pressure vessel 1 ahead of injectors 18A and 18B in order to maintain a constant population of microorganisms for continuous biochemical reactions inside said pressure vessel 1. The waste gas 62 from gas bubbles is discharged to air environment, while a few settled silts 68 is collected from the bottom of said open vessel 63. The subnatant in said open vessel 63 is the treated wastewater 90 to be discharged. Ideally, the waste gas is collected by an enclosure 91 and a gas mover (vacuum pump) 81, purified by a demister and adsorber assembly 94, and recycled by a gas compressor 07 to said pressure vessel 1 for reuse.

TABLE 1

| WATER PURIFICATION BY TWO-STAGE CHEMICAL-PHYSICAL PROCESS | | |
|---|---|---|
| Parameters | Influent Characteristics Before Treatment | Effluent Characteristics After Treatment |
| Coliforms, #/100 ml | 3 | 0 |
| Color, unit | 5 | 0.5 |
| Turbidity, NTU | 2 | 0.2 |
| pH, unit | 7.2 | 8.0 |
| Hardness - Mg, mg/l as $CaCO_3$ | 42 | 2.5 |
| Hardness - Ca, mg/l as $CaCO_3$ | 175 | 12 |
| Phosphate P, mg/l | 0.5 | 0.4 |
| Fe, mg/l | 0.4 | 0.2 |
| Mn, mg/l | 0.06 | 0.05 |
| $CO_2$, mg/l | 9.8 | 0 |
| Bicarbonate Alkalinity, mg/l as $CaCO_3$ | 120 | 20 |

TABLE 2

| WATER PURIFICATION BY SINGLE-STAGE CHEMICAL-PHYSICAL PROCESS | | |
|---|---|---|
| Parameters | Influent Characteristics Before Treatment | Effluent Characteristics After Treatment |
| Coliforms, #/100 ml | 3 | 0 |
| Color, unit | 420 | 4 |
| Turbidity, NTU | 75 | 0.5 |
| pH, unit | 6.7 | 8.0 |
| Hardness, mg/l as $CaCO_3$ | 312 | 28 |
| Phosphate-P, mg/l | 8 | 0.5 |
| Fe, mg/l | 10 | 0.2 |

TABLE 2-continued
WATER PURIFICATION BY SINGLE-STAGE CHEMICAL-PHYSICAL PROCESS

| Parameters | Influent Characteristics Before Treatment | Effluent Characteristics After Treatment |
|---|---|---|
| Mn, mg/l | 0.9 | 0.01 |
| Ni, mg/l | 3.5 | 0.6 |
| Cr, mg/l | 0.2 | 0.01 |
| Hg, mg/l | 0.002 | 0.002 |
| Cd, mg/l | 0.2 | 0.005 |
| Cu, mg/l | 1.5 | 0.25 |
| Zn mg/l | 6.1 | 0.5 |
| Pb, mg/l | 1.2 | 0.005 |
| Ag, mg/l | 0.1 | 0.03 |
| Se, mg/l | 0.01 | 0.01 |
| Ba, mg/l | 0.8 | 0.8 |
| As, mg/l | 0.01 | 0.01 |

TABLE 3
WASTEWATER TREATMENT BY BIOCHEMICAL PROCESS

| Parameters | Influent Characteristics Before Treatment | Effluent Characteristics After Treatment |
|---|---|---|
| Coliforms, #/100 ml | 2,600,000 | 10,200 |
| Color, unit | 750 | 30 |
| Turbidity, NTU | 96 | 2.8 |
| pH, unit | 6.8 | 7.2 |
| Alkalinity, mg/l as $CaCO_3$ | 130 | NA |
| Ammonia-N, mg/l | 15 | 2 |
| Phosphate-P, mg/l | 12.8 | 0.3 |
| BOD-5 day, mg/l | 310 | 20 |
| TSS, mg/l | 320 | 3 |

The present invention is specific for compressed and-/or uncompressed gaseous solutes to be fed to a liquid solvent inside of a sealed pressure vessel 1 and then dissolved into said liquid solvent at controlled pressure liquid flow rate, gas flow rate, liquid rotation velocity, and detention time. Compressed gas addition is provided by a gas compressor 107 (FIGS. 1–7B) while the uncompressed gas addition is provided by a vacuum gas injector 18. The present invention also relates to an improved pressurized water release assembly 40 that receives the pressurized water from said pressure vessel 1 for uniform pressurized water distribution, pressure reduction and fine bubbles generation, aiming at development of improved chemical-physical process, chemical process and biochemical processes.

There is thus provided by the invention a gas dissolving and releasing method and apparatus which efficiently dissolves gas or gases into a selected liquid stream for various environmental engineering applications, such as aeration, oxygenation, chlorination, nitrogenation, recarbonation (carbonation), ozonation, etc. The present invention occupies a relatively small space, does not require adjusting liquid level in said pressure vessel 1, creates no air pollution, and is relatively low in cost. The apparatus is particular suitable for use in generating fine bubbles to separate contaminants by various adsorptive bubble separation processes (such as dissolved air flotation, dispersed air flotation, foam separation, froth flotation, etc.). It is also very suitable for use in the improved aeration systems for bio-oxidation and in the improved ozonation systems for oxidation of iron, manganeses and other reducing impurities. Furthermore, the present invention provides an efficient mean for dissolving carbon dioxide into water for carbonation, recarbonation and hardness removal.

It will be understood, however, that the described system may be repiped for filtering and purifying other contaminated or unclarified liquid sources to render the liquid fit for specific applications. The single-stage biochemical process described in Example 3 and illustrated in FIG. 5A can be repiped, forming a dual biochemical process (FIG. 6A), or forming a low-energy biochemical process (FIGS. 7A and 7B).

For operation of a dual biochemical process (FIG. 6A) in accordance with the present invention, a portion of the pretreated effluent from said pretreatment chamber 60 flows to a bioreactor 95 for biochemical reactions there, in the presence of oxygen 76 and air 58 supplied to said bioreactor 95. The effluent from said bioreactor 95 flows to the open vessel 63 for further treatment. A portion of the floating scum 67 containing mainly micro-organisms is recycled to said bioreactor 95 in order to maintain a constant population of microorganisms in said bioreactor 95. The remaining process operation of said dual biochemical process (FIG. 6A) is identical to that of a single-stage biochemical process (FIG. 5A; Example 3).

For operation of a low-energy biochemical process (FIGS. 7A and 7B) in accordance with the present invention, all pretreated effluent from said pretreatment chamber 60 flows to a bioreactor 95 for biochemical reactions there, in the presence of oxygen 76 and air 58 supplied to said bioreactor 95. The effluent from said bioreactor 95 flows to the open vessel 63 for further treatment. A portion of the floated scum 67 containing mainly microorganisms is recycled to said bioreactor 95 in order to maintain a constant population of microorganisms in said bioreactor 95. A portion of final effluent 90 is recycled by the pump 17 to the gas dissolving units including: gas injectors 18A & 18B, pressure vessel 1, pressurized water release assembly 40, and open vessel 63. The remaining process operation of said low energy biochemical process (FIGS. 7A and 7B) is identical to that of a single-stage biochemical process (FIG. 5A; Example 3).

Figure 7A:
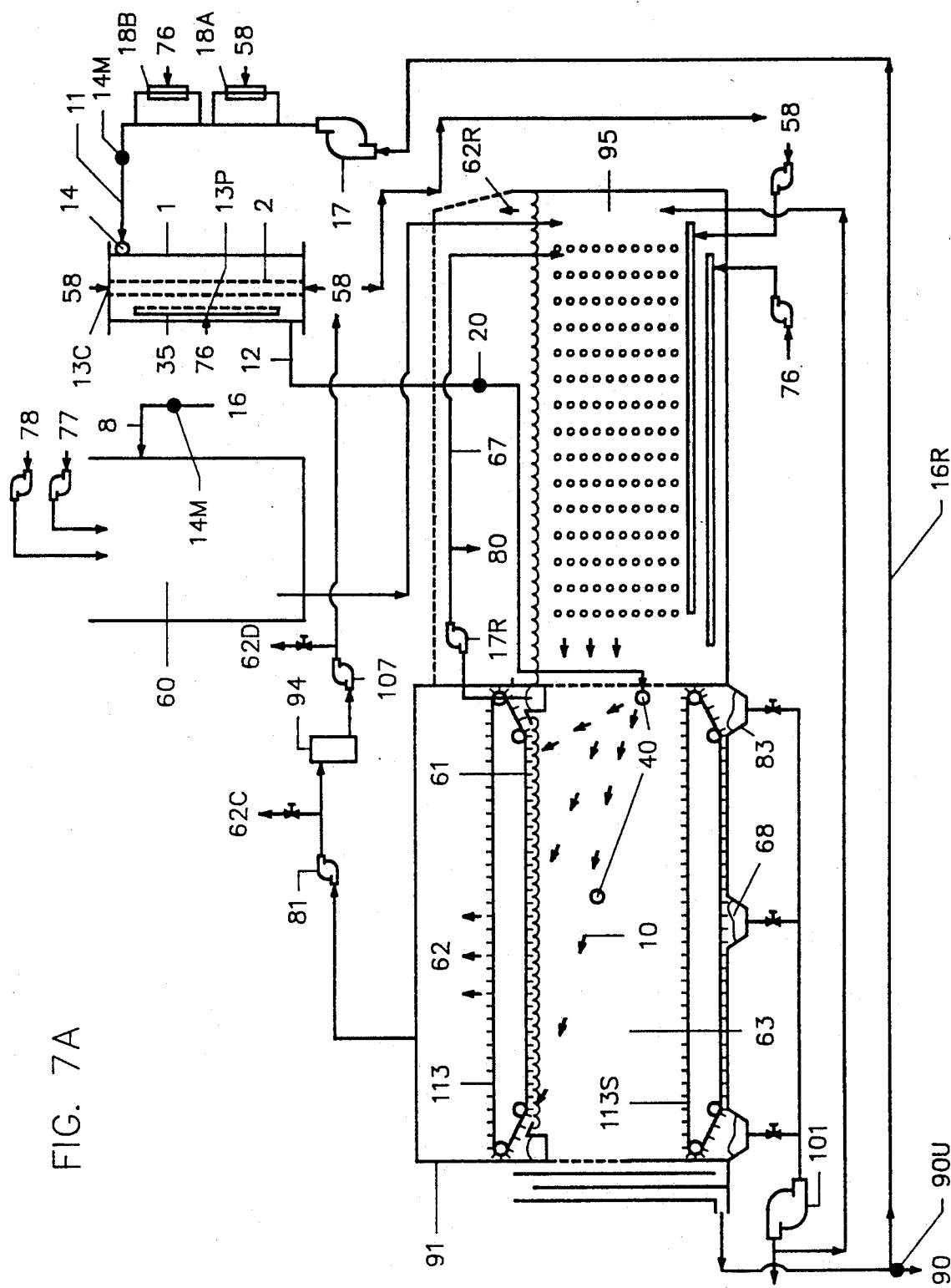
FIG. 7A is the rectangular or square low-energy biochemical process apparatus.
Figure 7B:
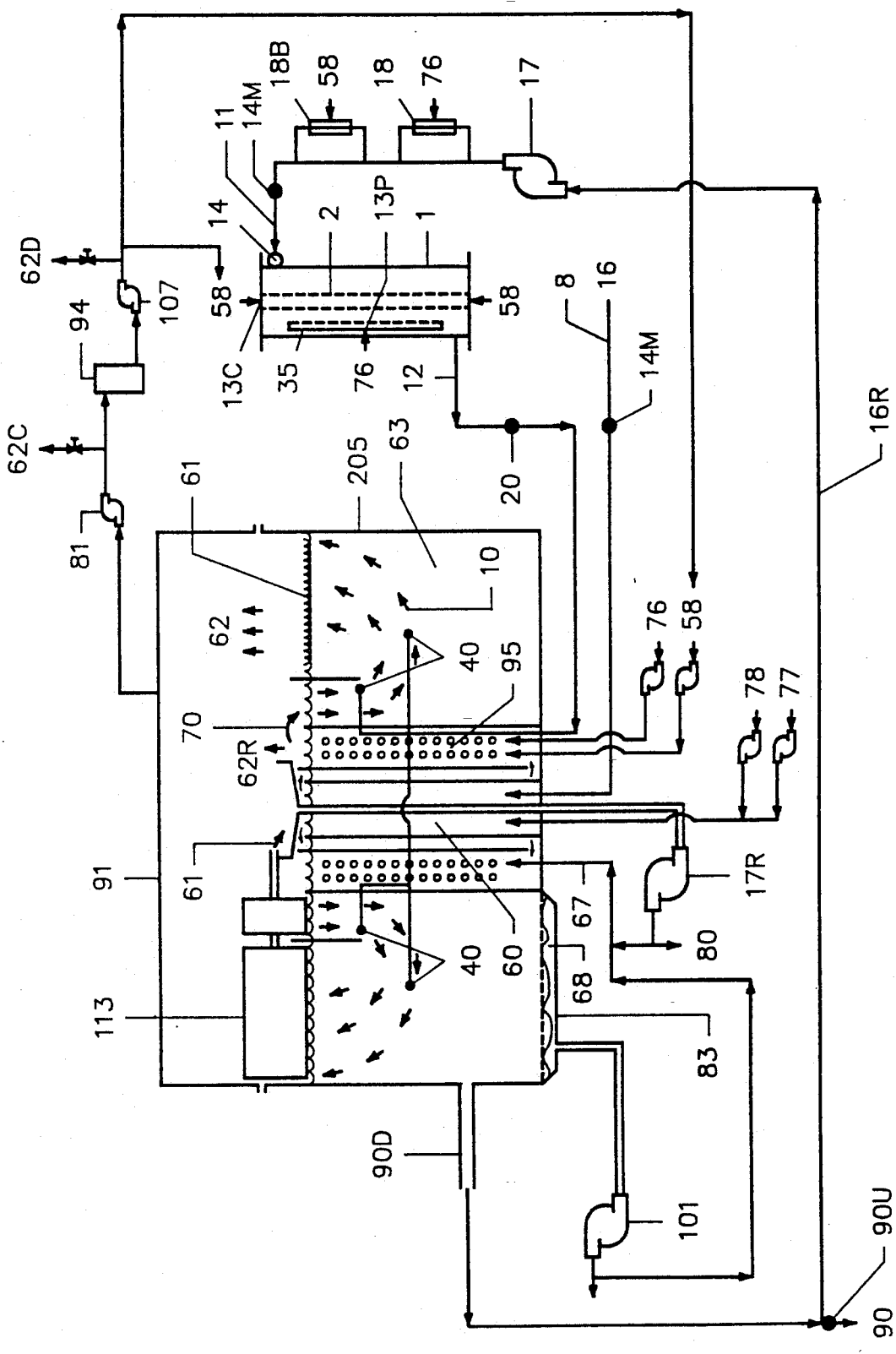
FIG. 7B is the circular low-energy biochemical process apparatus.

The low energy biochemical apparatus illustrated in FIGS. 1 and 2 are similar to that illustrated in FIGS. 7A and 7B, respectively, except that the former (FIGS. 1 and 2) adopt a hanging biological contactor (HBC) 200 in the bioreactor 95, but the latter (FIGS. 7A and 7B) adopt a suspended growth bioreactor 95. The shapes of said low energy biochemical process apparatus shown in FIGS. 1 and 7A are rectangular, and the shapes of equivalent apparatus shown in FIGS. 2 and 7B are circular; however, the theories and principles of all four apparatus (FIGS. 1, 2, 7A, and 7B) are alike, and have been described earlier.

Special features of said suspended growth bioreactor 95 (FIGS. 7A and 7B) include, but are not limited to:

(a) uniform suspension of microorganisms in said bioreactor 95 in the presence of coarse air bubbles 58 and/or oxygen bubbles 76 with bubble diameter much greater than 80 microns;

(b) discharge of an effluent of said bioreactor 95 containing about 1,500 mg/l to 7,500 mg/l of microorganisms into said open vessel 63 for subsequent microorganisms (i.e. biological flocs) flotation using fine gas bubbles 10 with bubble diameter much smaller than 80 microns;

(c) discharge of an effluent 90 of said open vessel 63;

(d) recirculation of a portion of the effluent 90 of said open vessel 63 to said pressure vessel 1 for dissolution of air 58 and/or oxygen 76;

(e) recirculation of floated sludge 61 and/or settled sludge 68 containing extremely high concentrations of microorganisms to said bioreactor 95 through recycle pipes;

(f) discharge of excessive amount of microorganisms 80 as the waste sludge; and (g) recirculation of an emitted gas 62 for reproduction of coarse air bubbles 58 in said bioreactor 95, or fine bubbles 10 in said open vessel 63 through said pressure vessel 1. While the suspended growth bioreactor 95 in FIGS. 7A and 7B is simple in operation and cost-effective in design and construction, it requires secondary clarification by dissolved air flotation or equivalent in an open vessel 63 for separation and recirculation of microorganisms in order to keep a constant microorganism population in said bioreactor 95, and to keep a low suspended solids concentration in the effluent 90.

Special features of said HBC bioreactor 95 (FIGS. 1 and 2) of this invention include, but are not limited to:

(a) growth of attached microorganisms onto said hanging biological contactor 200 inside said bioreactor 95 without requiring coarse air bubbles 58 and/or oxygen bubbles 76;

(b) provision of suspended microorganisms surrounding said hanging biological contactor 200 inside said bioreactor 95 when necessary;

(c) provision of coarse air bubbles 58 and/or oxygen bubbles 76 to said bioreactor 95 when necessary;

(d) discharge of an effluent of said bioreactor 95 containing low concentration of microorganisms normally below 1,000 mg/l into said open vessel 63 for subsequent microorganisms flotation using fine gas bubbles 10;

(e) discharge of an effluent 90 of said open vessel 63;

(f) recirculation of a portion of the effluent 90 of said open vessel 63 to said pressure vessel 1 for dissolution of air 58 and/or oxygen 76;

(g) recirculation of floated sludge 61 and/or settled sludge 68 containing microorganisms to said bioreactor 95 through recycle pipes when necessary;

(h) discharge of excessive amount of microorganisms 80 as the waste sludge; and (i) recirculation of an emitted gas 62 for reproduction of fine gas bubbles 10 in said open vessel 63 through said pressure vessel 1, or reproduction of coarse air bubbles 58 in said bioreactor 95 when necessary.

biological contactor (HBC) 200 is normally submerged in said bioreactor 95 for biological treatment of said wastewater, and is periodically and mechanically brought out from said wastewater for the attached microorganisms to be exposed to the air for respiration.

Accordingly, the suspended microorganisms surrounding said hanging biological contactor (HBC) 200 inside said bioreactor, the coarse air bubbles 58 and/or oxygen bubbles 76 available to said bioreactor 95, and the recycled floated sludge containing microorganisms through the recycle pipe 67 to maintain a constant population of microorganisms (FIGS. 1 and 2) all become optional and are not absolutely required. Under an ideal operational situation of said hanging biological contactor (HBC) 200, the total suspended solids (TSS) concentration surrounding said HBC as well as in the effluent of said bioreactor 95 are below 30 mg/l, entire operation of open vessel 63 and pressure vessel 1 can be idled for energy saving. The provision of suspended microorganisms surrounding said HBC 200, the coarse air bubbles 58, oxygen bubbles 76, and the recycle pipe 67 to said bioreactor 95 with a built-in HBC 200, however, will allow the biochemical apparatus of this invention (FIGS. 1 and 2) to treat a wastewater having an organic loading much higher than normal domestic sewage.

Referring to FIGS. 1 and 2, the hanging biological contactor (HBC) 200 in said bioreactor 95 of said biochemical apparatus comprises many filamentous media supported by a top frame 201 and a bottom frame 202. A mechanical means (not shown) brings said HBC 200 totally or partially off said wastewater for contacting air periodically so the microorganisms attached on the filamentous media of said HBC 200 will have enhanced respiration reactions. The microorganisms attached on said HBC 200 consume the organics in wastewater inside said bioreactor 95, grow more microorganisms to increase the thickness of microorganisms layer on the surface of said filamentous media, and at the same time purify the wastewater. The thicker the microorganism layer, the weaker the binding force between the microorganisms and the filamentous media of said HBC 200. Only the excessive amount of microorganisms on the outside microorganism layer will eventually be washed away by the shearing force of wastewater flow inside said bioreactor 95, becoming the total suspended solids in the effluent of said bioreactor 95. The population of the remaining attached microorganisms is usually sufficient for wastewater treatment. The shape of filamentous media of said HBC 200 can be of coil-type (FIGS. 1 and 2, tree-type, straight, curved, or combinations thereof.

Referring the FIGS. 1 and 7A, the bioreactor 95 and the open vessel 63 of said biochemical apparatus may share one common wall with openings, and each may be covered for air emission control and air recirculation if necessary. Alternatively, the bioreactor 95 and the open vessel 63 may be two separate process units without a common wall, but connected by a pipe (not shown). The depth of said bioreactor 95 (FIGS. 1 and 7A) ranges from 5 feet to over 200 feet, while the depth of said open vessel 63 for flotation only ranges from 5 feet to about 16 feet. When the depth of said bioreactor 95 is over 100 feet, and the shape of said bioreactor 95 is cylindrical, the bioreactor 95 is also referred as a "deep-shaft" process reactor.

Referring to FIGS. 2 and 7B, the biochemical circular apparatus, 205 of this invention is also a circular package plant comprising: (a) a circular pretreatment chamber 60 positioned in the center, connected to said influent pipe 8, and receiving the influent 16 and chemicals 77 and 78 for treatment; (b) a circular bioreactor 95 positioned as an outside ring of said circular pretreatment chamber 60, and receiving the effluent of said pretreatment chamber 60 for treatment; (c) a circular open vessel 63 positioned as an outside ring of said bioreactor 95, and receiving the effluent of said bioreactor 95 for treatment; (d) a circular pressurized water release assembly 40 connected to said pressure vessel 1, and positioned inside said open vessel 63 as two rings for generation of fine gas bubbles 10 to float suspended, oily, and surface active contaminants; (e) a common circular bottom positioned at the bottom of said circular apparatus 205 and a common circular enclosure 91 positioned at the top of said circular apparatus 205 both shared by said pretreatment chamber 60, bioreactor 95 and open vessel 63; (f) a rotating and travelling sludge removal means 113R positioned on the top of said open vessel 63, travelling 360 degrees over said open vessel 63 for collecting the floated sludge 61 from water surface of said open vessel 63 and discharging the floated sludge 61 into a circular funnel at the center of said circular apparatus 205; (g) stationary sludge removal means 83 and 101 for collecting the settled sludge 68 and recycling the same 68 to said bioreactor 95 when necessary; (h) discharge means 90D to discharge the subnatant below said floated sludge 61 as a clarified effluent 90; (i) means 16R for recycling a portion of said clarified effluent 90 to the pressure vessel 1; (j) gas collection and purification means positioned over the top of said circular apparatus 205 for receiving and purifying gas escaping from said circular apparatus 205, and comprising said enclosure 91, a vacuum pump (gas mover) 81, a gas purifier (demister and adsorber assembly) 94, and a gas compressor 107; (k) said cylindrical pressure vessel 1 connected to said circular apparatus 205 for dissolving gases 58 & 76 into water under pressure; and (1) means for feeding chemicals 77 & 78.

The microorganisms and organisms used in this invention are selected from a group comprising algae, bacteria, fungi, protozoans, rotifers, crustaceans, hyacinth plants, duckweeds, or combinations thereof, in the form of rooted growth, suspended growth, attached growth, or combinations thereof. The microorganisms and organisms used in this invention are normally aerobic and facultative in nature when oxygen 76 or air 58 is supplied for bio-oxidation reactions. Alternatively, the microorganisms and organisms used in this invention are facultative and anaerobic in nature when oxygen 79 and air 58 are discontinued or replaced by inert gases, such as nitrogen and helium.

The chemical-physical apparatus of this invention illustrated in FIGS. 3A, 3C, 3E, 4B, 4C, 4D, and 4E are very similar to the biochemical apparatus illustrated in FIGS. 1, 2, 5A, 6A, 7A, and 7B, except that said chemical-physical apparatus does not have a bioreactor 95, but has added stabilization means 71 and filtration means 64 as the post-treatment means.

Figure 4A:
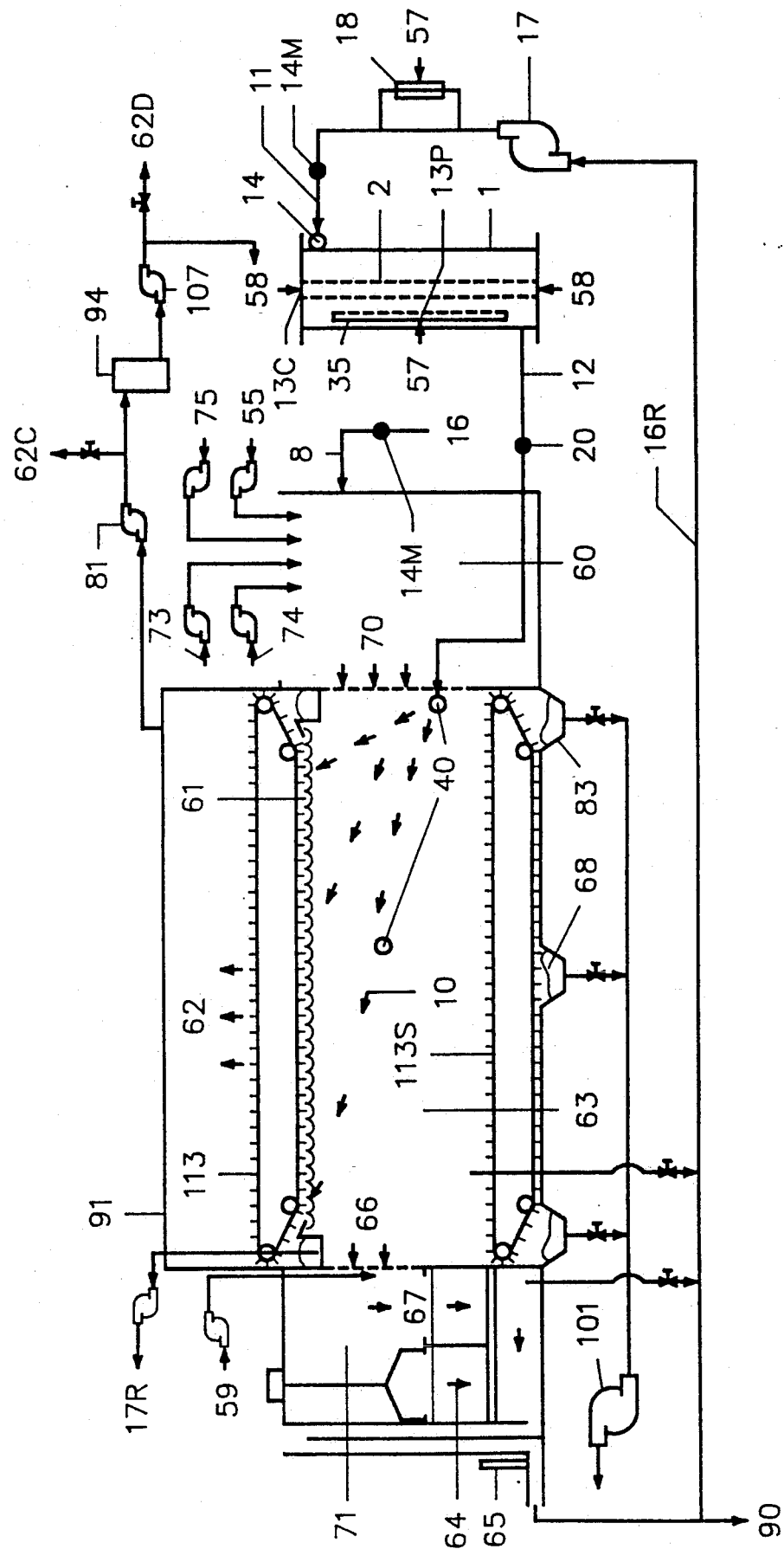
FIG. 4A shows another rectangular or square single-stage chemical-physical process apparatus of this invention, which described in Example 2.
Figure 4B:
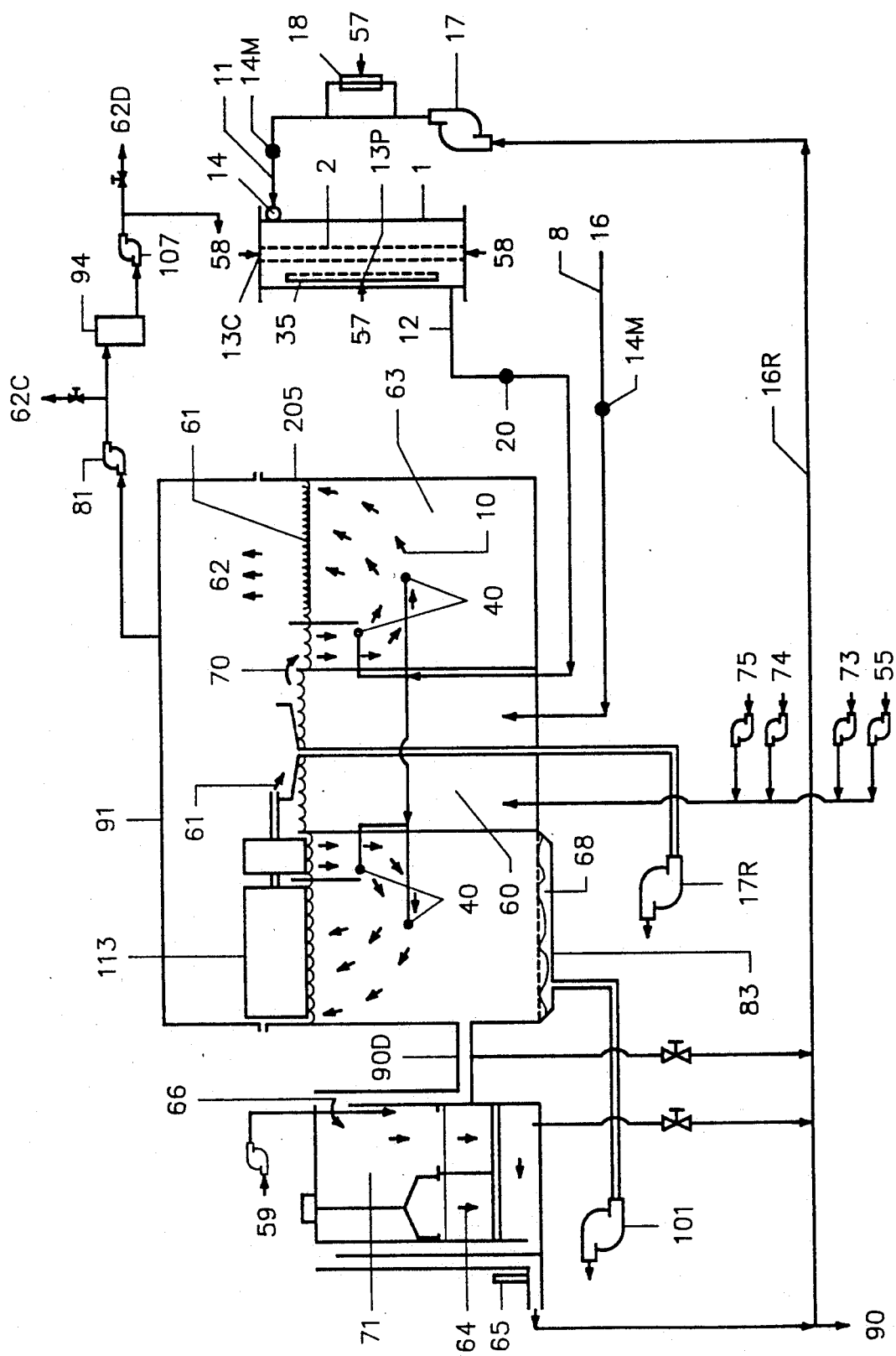
FIGS. 4B, 4C, 4D, and 4E show four circular single-stage chemical-physical process apparatus of this invention, which are also described in Example 2.
Figure 4C:
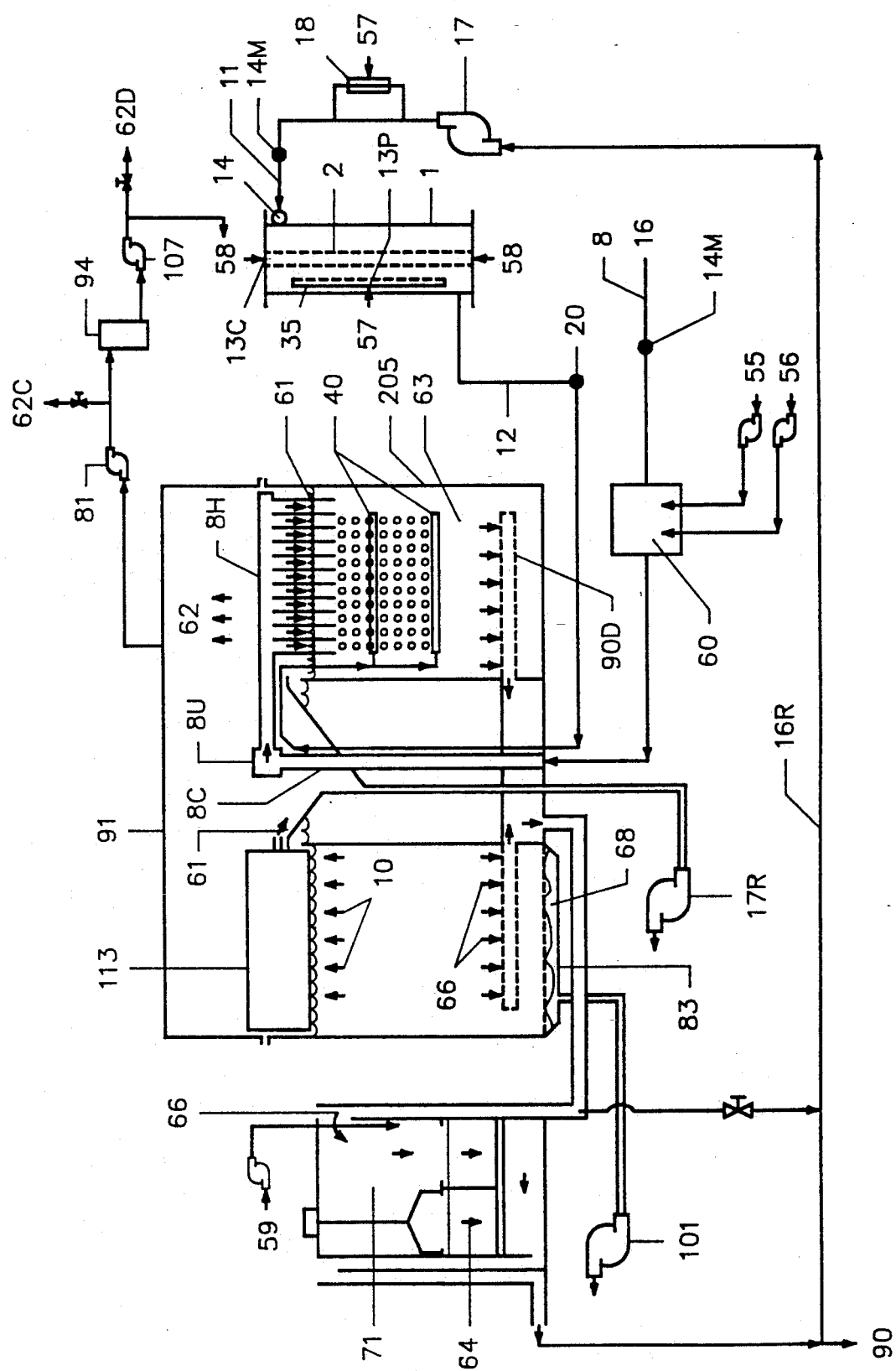
Figure 4D:
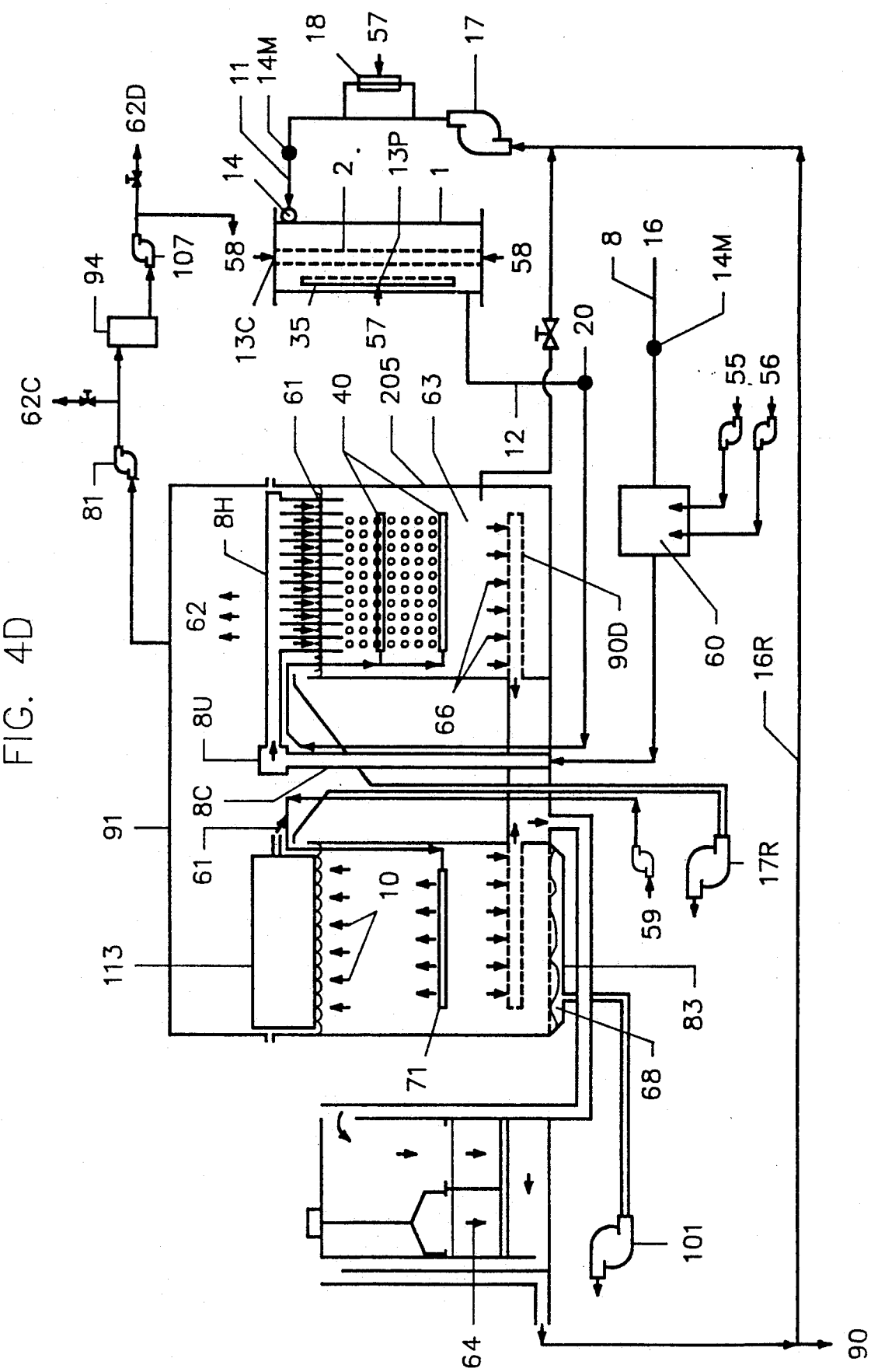
Figure 4E:
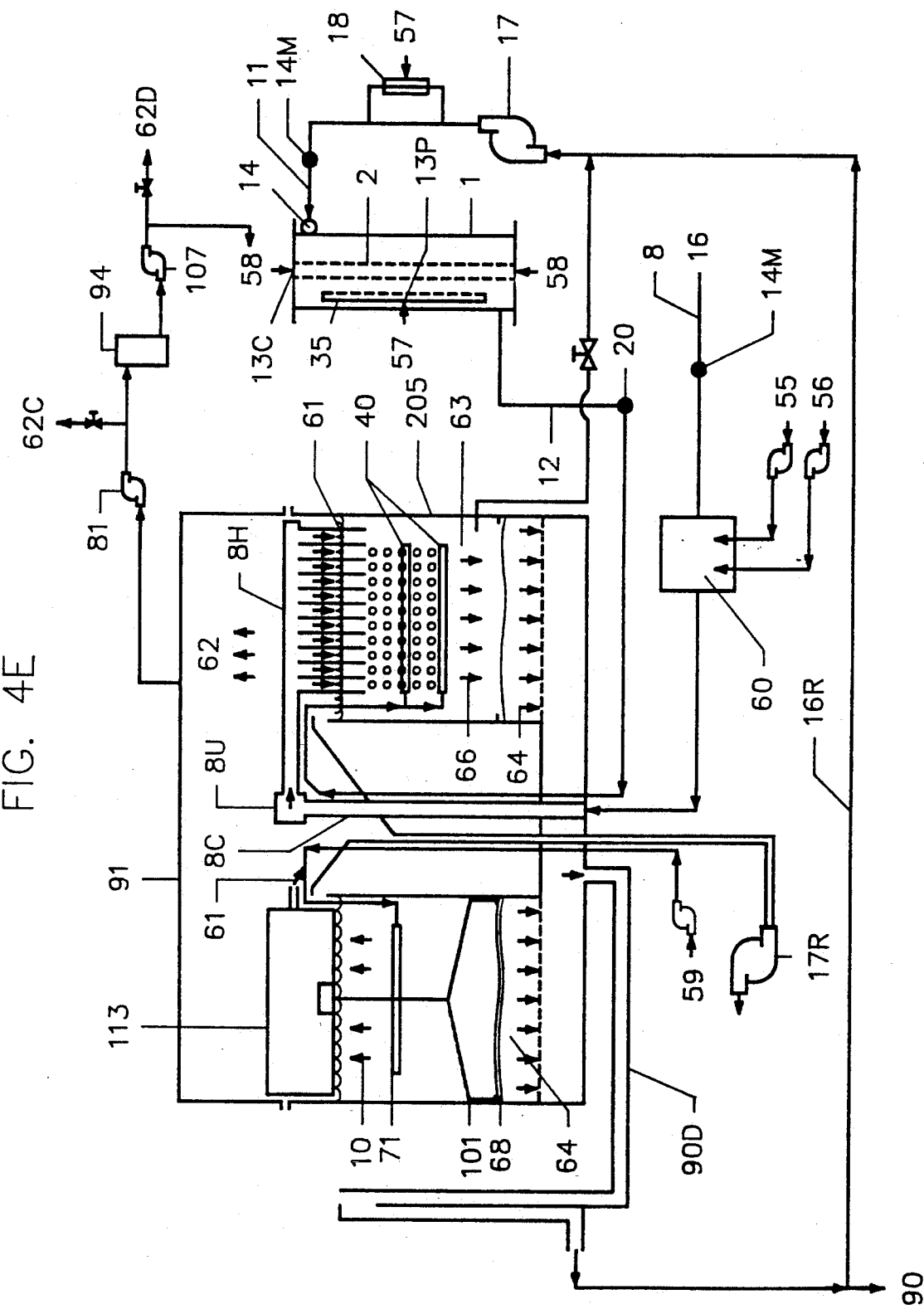

The effluent discharge pipe means 90D shown in FIGS. 2, 3C, 3D, 4B, and 7B can be alternatively repiped to the center of said circular apparatus 205 similar to the effluent discharge pipe means 90D shown in FIGS. 4C, 4D, and 4E.

While the pressurized water release assembly means 40 shown in FIGS. 1, 2, 3A, 3B, 3C, 3D, 3E, 4A, 4B, 5A, 6A, 7A, and 7B are stationary, the pressurized water release assembly means 40 shown in FIGS. 4C, 4D, and 4E are horizontally rotating/travelling 360 degrees inside said open vessel 63. Referring to FIGS. 4C, 4D, and 4E, the center inlet pipe 8C and the inlet universal joint 8U are stationary. The horizontal inlet distribution pipe 8H and the stabilization means 71 are also horizontally rotating 360 degrees inside said circular apparatus 205.

When necessary, the operation of said pump 17 and 17B and said gas compressor 107 and 107B, said pressure vessel 1 and 1B and pressurized water release assembly means 40 and 40B in FIGS. 1 to 7B are idled or removed, then the open vessel 63 and 63B is operated as a sedimentation clarification means without micro bubbles 10 (instead of a normal flotation clarification means with micro bubbles 10).

An ultrafiltration/microfiltration means 90U is ideally adopted for enhancement or replacement of a dissolved air flotation (using said open vessel 63 and pressure vessel 1), when hanging biological contactor (HBC) 200 is adopted in the biochemical apparatus of this invention.

Referring to FIGS. 1-7B, various liquid streams or combinations thereof can be pressurized by said pump 17, and discharged to said pressure vessel 1 through a gas injector 18. The effluent of pressure vessel is depressurized in stages in a subsequent said pressurized water release assembly 40. At least one open vessel 63 can be used to receive said influent liquid stream 16 with or without chemicals/microorganisms, to hold the depressurized liquid containing micro gas bubbles 10, and to separate the subnatant and the floated scum 61. Sludge removal means 113 and 101 are used for collection of floated scum 61 and settled sludge 68 periodically or continuously. A vacuum pump or a gas mover 81, a demister and adsorber assembly 94 and an enclosure 91 over the top of said open vessel 63 are used for collection and purification of waste gases from said open vessel 63.

For the best mode of operation and accommodation of said pressurized water release assembly 40, said open vessel 63 is of rectangular or square in shape. However, circular open vessel can also be adopted (FIGS. 2, 3C, 3D, 4B-4E, and 7B).

A liquid flow measuring means 14M which can be a liquid flow meter, a liquid nozzle assembly, a venturi meter, or combinations thereof for controlling flow rate of a liquid entering said pressure vessel 1.

The high liquid rotation velocity over 2,500 rpm inside said pressure vessel 1 is created by a liquid nozzle assembly, a porous center gas dissolving tube, a mechanical mixer, a recirculation pump, or combinations thereof.

As shown in FIGS. 1-7B, the inlet pipe 8 is directly or indirectly connected to a pretreatment chamber 60 where chemicals and/or microorganisms are dosed for various liquid treatment applications. When the influent liquid stream 16 is heavily contaminated by oil or suspended solids, an oil-water separator (a separation module made of coalescing module units) 60A (FIG. 3E) or a solid-water separator (a separation module made of laminar module units) 60A (FIG. 3A) positioned inside said pretreatment chamber 60, and connected to said inlet pipe 8 is for oil-water or solid-water separation prior to entering the gas dissolving and releasing system. Such oil-water separator 60A shown in FIG. 3E and/or solid/water separator 60A shown in FIG. 3A can be installed in similar apparatus of this invention shown in FIGS. 1, 2, 3B, 4A, 4D, 4E, 5A, 6A, 7A, and 8B.

While the present invention has been described with reference to particular embodiments thereof, it will be understood that numerous other minor modifications may be made by those skilled in the art without departing from the scope of the invention. Therefore, the following examples are intended to cover all such equivalent variations as come within the true spirit and scope of the invention. The following are typical alterations and variations which are within the spirit and scope of this invention.

Figure 8A:
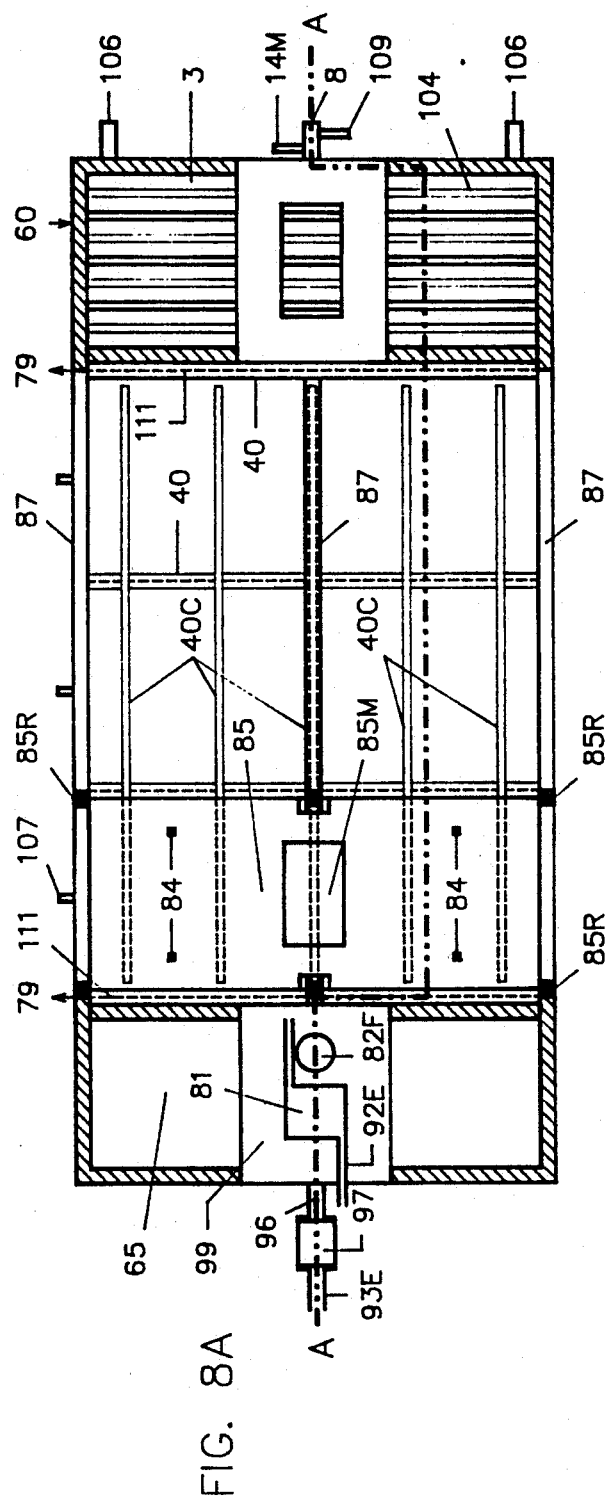
FIGS. 8A and 8B illustrate an improved rectangular liquid treatment apparatus in accordance with this invention.
Figure 8B:
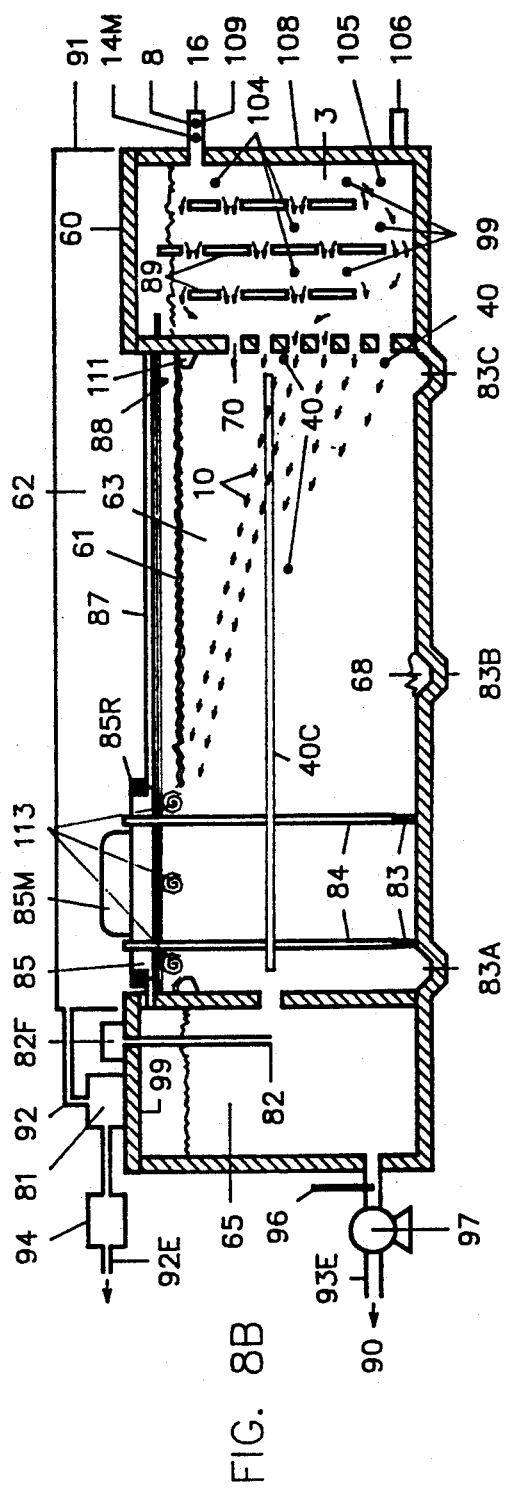

FIGS. 8A and 8B together illustrate an improved liquid treatment apparatus comprising inlet pipe 8, liquid flow measuring means 14M, pretreatment chamber 60, pressurized water release assembly 40 which receives the pressurized liquid flow from said cylindrical pressure vessel 1, open vessel 63, effluent pipe 93E, sludge removal means 83A, 83B, 83C, 83, 84, 85, 85M and 113, and waste gas collection and purification means 81, 91, 92, 93E, and 94.

In operation of the liquid treatment apparatus shown in FIGS. 8A and 8B, the influent 16 enters the pretreatment chamber 60 of said apparatus through inlet pipe 8 and the liquid flow measuring means 14M where the flow rate is measured.

Various gaseous or liquid chemicals are added to said pretreatment chamber 60 from the chemical feed pipes 99, 104, and 105. The liquid 70 containing chemicals passes through the outlet of said pretreatment chamber 60 and reaches the open vessel 63 where the micro gas bubbles 10 with diameter less than 80 microns are generated from the pressurized water release assembly 40. Inside of said open vessel 63, the light-weight, suspended solids and chemical flocs are floated from the bulk liquid to liquid surface forming the floated scums 61; the heavy-weight settleable matters settle at bottom forming the settled sludges 68; the waste gas 62 is released from liquid surface; while the clarified liquid 90 (subnatant) is discharged from said open vessel 63 through a pump 97 and effluent pipe 93E. When necessary, gas chemical is fed to the clarified effluent from open vessel 63 by chemical feeder 82F at a feed point 82; while liquid or solid chemical is fed by another chemical feeder 96 to the same clarified effluent of open vessel 63.

The waste gas collection and purification means 91, 92, 81, 94, and 92E is located on the top of said apparatus shown in FIGS. 8A and 8B. In operation, the waste gas 62 is collected by said enclosure 91, gas pipe 92, and said gas mover 81, purified by said granular activated carbon filter 94, and discharged through said gas outlet 92E.

The sludge removal means 83, 84, 85, 85M, and 113 shown in FIGS. 8A and 8B moves horizontally back and forth inside said open vessel 63 for collection of settled sludge 68 in collection hoppers 83A, 83B, and 83C. The flexible brushes 83, rigid rods 84, sludge collector 113 are all mounted on a moving platform known as moving bridge 83 which is driven by a motor 85M with rollers 85R back and forth on and along rails 87. The floated scums 61 from said collection channels 111 are discharged at outlet 79 for further disposal.

Alternatively, the moving bridge 85, motor 85M, rigid rods 84, flexible brushes 83, and rollers 85R shown in FIGS. 8A and 8B can all be replaced. The sludge collector 113 can be mounted permanently on top and be extended to cover entire liquid surface of said open vessel 63 for collection of said floated scums 61 (FIG. 3A). Another sludge collector 113 (FIG. 3A) can be mounted permanently ad be extended to cover entire bottom of said open vessel 63 for gently pushing the settled sludges 68 into collection hoppers 83A, 83B, and 83C.

The sludge collector 133 for removing the floated scum 61 is a rotating skimmer (shown in FIGS. 3A, 3B, 3D, 3E, 4A, 5A, 6A and 7A), rotating scoop(s) (shown in FIGS. 3C, 3D, 4B, 4C, 7B, 8A, and 8B), or combinations thereof. The sludge collector for removing settled sludge 68 from said open vessel 63 is either a rotating sludge removal mean 101A (FIG. 3A) or travelling sludge removal means 83-85R (FIGS. 8A and 8B).

Alternatively, the bottom of said liquid treatment apparatus shown in FIGS. 8A and 8B can have a slope and the waste gas collection and purification means 91, 92, 81, 94, and 92E is removable.

Alternatively, the baffles 89 in pretreatment chamber 60 shown in FIGS. 8A and 8B can be totally or partially replaced by coalescing modules 60A (FIG. 3E) so the pretreatment chamber 60 totally or partially becomes an oil-water separator.

Still alternatively, the pressurized water release assembly 40C shown in FIGS. 8A and 8B can be installed inside said open vessel 63 in addition to or instead of regular pressurized water release assembly 40 for improved floatation thickening of sludges. FIGS. 3A, 3B, 3C, 3D, 3E, 4A, 4B, 4C, 4D, 4E, 5A, 6A, 7A, and 7B illustrate the improved flotation thickening of this invention using more than one set of pressurized water release assembly 40.

Figure 6A:
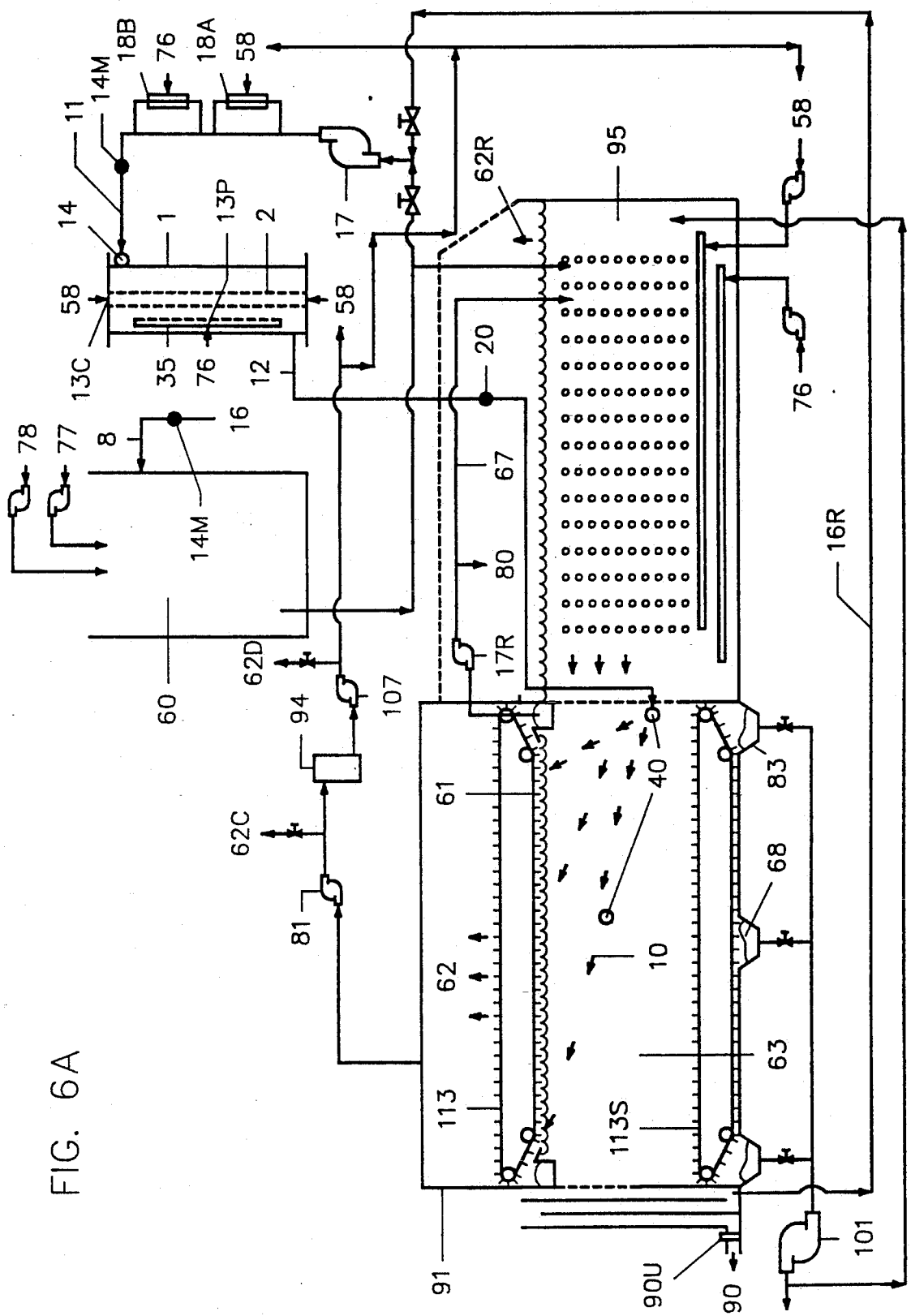
FIG. 6A is the rectangular or square dual biochemical process apparatus of this invention.

The bioreactor 95 of this invention shown in FIGS. 6A, 7A, and 7B is the suspended-growth microbiological system (activated sludge, lagoon), the rooted-growth ecological system (hyacinth plants, algae, duckweeds), the attached-growth microbiological system (biological fluidized bed, hanging biological contactor, rotating biological contactor, biological tower, trickling filter), the combined suspended attached-growth microbiological system (hanging biological contactor or rotating biological contactor or biological tower, or biological fluidized bed, each in the presence of suspended activated sludge) or combinations thereof.

The enclosed cylindrical pressure vessel 1 shown in FIGS. 1A and 1B, receives the liquid with or without chemicals and microorganisms from said pump 17, gas injector 18 and liquid flow measuring means 14M for pressurization, is full of liquid, equipped with a liquid inlet pipe 11, a liquid outlet pipe 12, an inlet nozzle assembly 14, a pressure gauge, a safety valve, a gas bleed-off valve, a plurality of gas inlets for feeding the second and the third gases, support legs, gas flow meters, gas regulators, at least one wall-mounted gas dissolving plate 35, one center gas dissolving tube 2, and maintained at 2-7 atmospheric pressure and over 2500 rpm liquid rotation velocity for total gas dissolution.

The apparatus of this invention, such as the pretreatment chamber 60, open vessel 63, stabilization means 71, filtration means 64, oil-water separator 60A and/or bioreactor 95 are totally separated individual units, individual units sharing common walls (shown in FIGS. 3A, 3E, 4A, 5A, 6A, and 7A), some individual units without common walls and some individual units with common walls (shown in FIG. 4B), or an integrated system (shown in FIG. 4E; in which the filter 64 is positioned at the bottom of said open vessel 63).

The apparatus of this invention is operated wither manually or automatically.

The bioreactor 95 of this invention, shown in FIGS. 6A and 7A can also be covered by the enclosure 91 extended from said open vessel 63 (indicated by the dotted lines in FIGS. 6A and 7A) for air pollution control. The enclosure 91, the demister and adsorber assembly 94, and the gas mover 81 shown in FIGS. 1-7B are removable and can be by-passed. The emitted gas 62 from said enclosure 91 can be by-passed through a pipe 62C. The purified gas from said demister and adsorber assembly 94 can also be by-passed through a pipe 62D.

To provide mobility, the apparatus of this invention is either skid-mounted, trailer mounted or truck mounted.

In addition to the chemicals disclosed in Examples 1, 2, and 3, other chemicals, such as aluminum sulfate, aluminum chloride, aluminum potassium sulfate, poly aluminum chloride, magnesium chloride, potassium iodide, potassium bromide, potassium permanganate, sodium iodide, sodium bromide, ferric sulfate, ferric chloride, aluminum ammonium sulfate, poly ferric chloride, ferrous sulfate, sodium sulfide, ferrous sulfide, sulfur dioxide, poly ferric sulfate, sodium aluminate, iodine, bromine, sodium fluoride, organic polymers, acid, base, magnesium bicarbonate, magnesium carbonate, surfactants, powdered activated carbons, or combinations thereof, can all be applied to the present invention for water purification, wastewater treatment, or sludge thickening.

Said gas purifier of this invention is a demister and adsorber assembly. Said adsorber further comprises gas filter element, coalescing adsorbent, fiber activated carbon, granular activated carbon, gas ultrafiltration membrane, gas ion exchanger, base treated activated carbon, or combinations thereof. Said base include sodium hydroxide, potassium hydroxide, calcium hydroxide, and sodium aluminate.

Said post-treatment means of this invention further comprises means for disinfection, stabilization, filtration (including ultrafiltration, microfiltration, automatic backwash filtration, granular activated carbon adsorption), or combinations thereof. Said means for filtration is packed with sands, manganese dioxide, greensands, granular activated carbon, granular activated alumina, ion exchange resins, coal, polymeric adsorbent, granular metal media, or combinations thereof.

What is claimed is:

1. An apparatus for dissolving a plurality of gases into a recycled liquid stream by pressurization, releasing the pressurized recycled liquid stream containing said dissolved gases to a reduced pressure, generating micro gas bubbles in a depressurized liquid stream, purifying gases escaping from said depressurized liquid stream, concentrating microorganisms as a floating scum on the surface of said depressurized liquid stream, recycling a portion of said concentrated microorganisms in the floating scum to an influent liquid stream for treating said influent liquid stream, and discharging a clarified effluent liquid stream comprising:

(a) an influent pipe means and a a liquid flow measuring means connected to the influent pipe means for measuring the flow of said influent liquid stream;

(b) a pretreatment chamber means directly or indirectly connected to said influent pipe means comprising feeder means for feeding chemicals and/or microorganisms into said influent liquid stream, separation modules means located in said pretreatment chamber means for removing oil and suspended solids from said influent liquid stream, and a first discharge means for discharging a pretreated effluent liquid stream;

(c) a bioreactor means connected to said pretreatment chamber means for receiving and treating said pretreated effluent liquid stream in the presence of microorganism, organisms and dissolved gas and producing a bioreactor effluent liquid stream and a waste gas stream; said bioreactor means further comprising means for delivering at least one gas to said bioreactor means;

(d) said means for delivering at least one gas comprises a bubbles distribution means positioned near bottom of said bioreactor means for generating coarse gas bubbles with diameter greater than 90 microns;

(e) means positioned inside said bioreactor means for holding microorganisms or organisms to be attached;

(f) means connected to said bioreactor means for discharging said bioreactor effluent liquid stream;

(g) means connected to said bioreactor means for receiving the recycled floating scum or settled sludges or both containing microorganisms;

(h) an inlet pipe means connected to a nozzle assembly means for feeding said recycled liquid stream, another liquid flow measuring means connected to the inlet pipe means for measuring the flow of said recycled liquid stream, gas injector means connected to said inlet pipe means for feeding a first gas into said recycled liquid stream, pump means connected to said inlet pipe means for forcing said recycled liquid stream through said gas injector means, said another liquid flow measuring means, and said nozzle assembly means;

(i) an enclosed cylindrical pressure vessel means having a tangentially disposed liquid stream vessel inlet means connected to said inlet pipe means for delivering said recycled liquid stream into said cylindrical pressure vessel means; said pump means, said nozzle assembly means and said inlet pipe means cooperating to feed the recycled liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means, gas flow meter means and regulator means connected to the plural gas inlet means for regulating the pressure in said pressure vessel means to 2-7 atmospheres, and a vessel outlet means;

(j) at least one pressurized meter release assembly means connected to the vessel outlet means of said pressure vessel means and positioned inside an open vessel means; said pressurized water release assembly means further comprising a pressure reduction valve for allowing said recycled liquid stream to be depressurized in stages under laminar flow conditions for generation of micro gas bubbles with diameter less than 80 microns in the depressurized liquid stream inside said open vessel means;

(k) said open vessel means connected directly or indirectly to said bioreactor means for receiving both the bioreactor effluent liquid stream from the bioreactor means and the depressurized liquid stream from the pressurized water release assembly means and for holding the depressurized liquid stream containing said micro gas bubbles sufficiently long so that a floating scum layer forms on the free surface of the liquid and a subnatant forms below the floating scum; a second discharge means to discharge said subnatant as said clarified effluent liquid stream; means, including said inlet pipe means, for recycling a portion of said effluent from the second discharge means to the pressure vessel means and defining said recycled liquid stream; sludge removal means for collecting of said floating scum on the liquid surface of said open vessel means and collection of settled sludges near bottom of said open vessel means; a removable gas collection and purification means positioned over the top of the open vessel means and bioreactor means to receive and purify waste gas stream escaping from said open vessel means and bioreactor means, and to recycle a purified gas stream to said pressure vessel means and said bioreactor means, said gas collection and purification means further comprising a gas mover, a gas purifier, gas by-pass lines, and an enclosure over said open vessel means and bioreactor means, said gas purifier, further comprising a demister and an adsorber;

(l) means including said sludge removal means connected to said open vessel means for recycling a portion of said floating scum and/or settled sludge containing microorganisms to said bioreactor means;

(m) post-treatment means connected to said open vessel means for further treating said clarified effluent liquid stream and producing a post-treated effluent liquid stream; and (n) a third discharge means to discharge said post-treated effluent liquid stream.

2. The apparatus of claim 1 wherein said open vessel means is rectangular open vessel means, or square open vessel means, or circular open vessel means.

3. The apparatus of claim 1 wherein said gas mover, gas by-pass lines, gas purified, and enclosure are removably mounted.

4. The apparatus of claim 1 wherein said separation modules means are coalescing modules for oil-water separation and/or laminar modules for solid-water separation.

5. The apparatus of claim 1 wherein said post-treatment means is a disinfection means, an ultrafiltration means, a micro-filtration means, a filtration means, an adsorption means, or combinations thereof, for further treating said clarified effluent liquid stream.

6. The apparatus of claim 1 wherein each of said liquid floor measuring means is a liquid flow meter, a venturi meter, a liquid nozzle assembly means, or combinations thereof.

7. The apparatus of claim 1 wherein said pressure vessel means comprises a porous center gas dissolving tube, at least one wall-mounted gas dissolving plate assembly means, or both.

8. The apparatus of claim 1 wherein said sludge removal means for collection of floating scum from the liquid surface is a rotating skimmer, a rotating scoop, or combinations thereof, and is of either movably mounted or stationary.

9. The apparatus of claim 1 wherein said sludge removal means for collection of settled sludges from bottom of said open vessel means is a rotating sludge removal means, or a movably mounted sludge removal means.

10. The apparatus of claim 1 wherein said means for holding the microorganisms comprises filamentous media means.

11. The apparatus of claim 1 wherein said pretreatment, said open vessel means and said post-treatment means are totally separated individual units without common walls, individual units sharing common walls, integrated systems, or combination thereof.

12. An apparatus for dissolving a plurality of gases into a recycled liquid stream by pressurization, releasing the pressurized recycled liquid stream containing said dissolved gases to a reduced pressure, generating micro gas bubbles in a depressurized liquid stream, purifying an influent liquid stream by a hanging biological contactor means, purifying gases escaping from said depressurized liquid stream, concentrating microorganisms as a floating scum on the surface of said depressurized liquid stream, recycling a portion of said concentrated microorganisms in the floating scum to said influent liquid stream for treating the depressurized liquid stream and discharging a clarified effluent liquid stream comprising:

(a) an influent pipe means and a liquid flow measuring means connected to the influent pipe means for measuring the flow of said influent liquid stream;

(b) pretreatment chamber means directly or indirectly connected to said influent pipe means comprising feeder means for feeding chemicals and/or microorganisms into said influent liquid stream, separation modules means located in said pretreatment chamber means for removing oil and suspended solids from said influent liquid stream, and a first discharge means for discharging a pretreated effluent liquid stream;

(c) bioreactor means connected to said pretreatment chamber means for receiving and treating said pretreated effluent liquid stream is the presence of microorganisms, organisms and dissolved gas and producing a bioreactor effluent liquid stream and a waste gas stream; said bioreactor means further comprising means for delivering at least one gas to said bioreactor means;

(d) said means for delivering at least one gas comprises a bubbles distribution means positioned near bottom of said bioreactor means for generating coarse gas bubbles with diameter greater than 80 microns;

(e) said hanging biological contactor means positioned inside said bioreactor means to hold microorganisms or organisms;

(f) mechanical means connected to said bioreactor means for periodic exposure of said hanging biological contactor means to the air for biological respiration;

(g) means connected to said bioreactor means for discharging said bioreactor effluent liquid stream to an open vessel means;

(h) means connected to said bioreactor means for receiving the recycled floating scum and settled sludges containing microorganisms;

(i) an inlet pipe means connected to a nozzle assembly means for feeding said recycled liquid stream, another liquid flow measuring means connected to the inlet pipe means for measuring the flow of said recycled liquid stream, gas injector means connected to said inlet pipe means for feeding a first gas into said recycled liquid stream, pump means connected to said inlet pipe means for forcing said recycled liquid stream through said gas injector means, said another liquid flow measuring means, and said nozzle assembly means;

(j) an enclosed cylindrical pressure vessel means having a tangentially disposed liquid stream vessel inlet means connected to said inlet pipe means for delivering said recycled liquid stream into said cylindrical pressure vessel means; said pump means, said nozzle assembly means and said inlet pipe means cooperating to feed the recycled liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means by gas compressor means and gas injector means, gas flow meter means and regulator means connected to the plural gas inlet means for regulating the pressure is said pressure vessel means to 2–7 atmospheres, and a vessel outlet means;

(k) at least one pressurized water release assembly means connected to the vessel outlet means of said pressure vessel means and positioned inside said open vessel means; said pressurized water release assembly means further comprising a pressure reduction valve for allowing said recycled liquid stream to be depressurized in stages under laminar flow conditions for generation of micro gas bubbles with diameter less than 80 microns in the depressurized liquid stream inside said open vessel means;

(l) said open vessel means connected directly or indirectly to said bioreactor means for receiving both the bioreactor effluent liquid stream from the bioreactor means and the depressurized liquid stream from the pressurized water release assembly means and holding the depressurized liquid stream containing said micro gas bubbles sufficiently long so that a floating scum layer forms on the free surface of the liquid and a subnatant forms below the floating scum;

(m) a second discharge means connected to said open vessel means to discharge said subnatant as said clarified effluent liquid stream;

(n) means connected to said open vessel means, including said inlet pipe means, for recycling a portion of said effluent from the second discharge means to the pressure vessel means and defining said recycled liquid stream;

(o) sludge removal means connected to said open vessel means for collection and removal of said floating scum on the liquid surface of said open vessel means and collection of settled sludges near bottom of said open vessel means;

(p) means for controlling the on/off operates of said pump means;

(g) gas compressor means connected to said pressure vessel means and said bubbles distribution means for supplying gas;

(r) a removable gas collection and purification means positioned over the top of the open vessel means and bioreactor means to receive and purify waste gas stream escaping from said open vessel means and bioreactor means, and to recycle a purified gas stream to said pressure vessel means and said bioreactor means, said gas collection and purification means further comprising a gas mover, a gas purifier, gas by-pass lines, and an enclosure over said open vessel means and bioreactor means, said gas purifier, further comprising a demister and an adsorber;

(s) means including said sludge removal means, connected to said open vessel means for recycling a portion of said floating scum, settled sludges, or both containing microorganisms to said bioreactor means;

(t) post-treatment means connected to said open vessel means for further treating said clarified effluent liquid stream and producing a post-treated effluent liquid stream; and (u) a third discharge means to discharge said post-treated effluent liquid stream.

13. The apparatus of claim 12 wherein said open vessel means is rectangular open vessel means, or square open vessel means, or circular open vessel means.

14. The apparatus of claim 12 wherein said gas mover, gas by pass lines, gas purifier, and enclosure are removably mounted.

15. The apparatus of claim 12 wherein said separation modules means are coalescing modules for oil-water separation and/or laminar modules for solid-water separation.

16. The apparatus of claim 12 wherein said sludge removal means for collection of floating scum from said liquid surface is a rotating skimmer, a rotating scoop, or combinations thereof, and is of either translatably mounted or non-translatably mounted.

17. The apparatus of claim 12 wherein said sludge removal means for collection of settled sludges from bottom of said open vessel means is a rotating sludge removal means, or a movably mounted sludge removal means.

18. The apparatus of claim 12 wherein said pressurized water release assembly means comprises more than one assembly.

19. The apparatus of claim 12 wherein said open vessel means has a flat bottom, or a slope bottom.

20. The apparatus of claim 12 wherein said pretreatment means, said bioreactor means, said open vessel means and said post-treatment means are totally separated individual units without common walls, individual units sharing common walls, integrated systems, or combinations thereof.

21. The apparatus of claim 12 wherein said apparatus is kid mounted, trailer mounted, truck mounted, or combinations thereof, for improving mobility.

22. An apparatus for dissolving a plurality of gases into a recycled liquid stream by pressurization, releasing the pressurized recycled liquid stream containing said dissolved gases to a reduced pressure, generating micro gas bubbles in a depressurized liquid stream, purifying an influent liquid stream by a hanging biological contactor means, concentrating microorganisms as a floating scum on the surface of said depressurized liquid stream, recycling a portion of said concentrated microorganisms in the floating scum to said influent liquid stream for treating the depressurized liquid stream, and discharging a clarified effluent liquid stream comprising:

(a) an influent pipe means and a liquid flow measuring means connected to the influent pipe means for measuring the flow of said influent liquid stream;

(b) pretreatment chamber means directly or indirectly connected to said influent pipe means comprising feeder means for feeding chemicals and/or microorganisms into said influent liquid stream, separation modules means located in said pretreatment chamber means for removing oil and suspended solids from said influent liquid stream, and a first discharge means for discharging a pretreated effluent liquid stream;

(c) bioreactor means connected to said pretreatment chamber means for receiving and treating said pretreated effluent liquid stream in the presence of microorganisms, organisms and dissolved gas and producing a bioreactor effluent liquid stream and a waste gas stream; said bioreactor means being 5 feet to over 200 feet is depth and further comprising means for delivering at least one gas to said bioreactor means;

(d) said means for delivering at least one gas comprises a bubbles distribution means positioned near bottom of said bioreactor means for generating coarse gas bubbles with diameter greater than 80 microns;

(e) said hanging biological contactor means positioned inside said bioreactor means to hold microorganisms or organisms; said hanging biological contactor means further comprising filamentous media means;

(f) mechanical means connected to said bioreactor means for periodic exposure of said hanging biological contactor means to the air for biological respiration;

(g) means connected to said bioreactor means for discharging said bioreactor effluent liquid stream to an open vessel means;

(h) means connected to said bioreactor means for receiving the recycled floating scum and settled sludges containing microorganisms;

(i) an inlet pipe means connected to a nozzle assembly means for feeding said recycled liquid stream, another liquid flow measuring means connected to the inlet pipe means for measuring the flow of said recycled liquid stream, gas injector means connected to said inlet pipe means for feeding a first gas into said recycled liquid stream, pump means connected to said inlet pipe means for forcing said recycled liquid stream through said gas injector means, said another liquid flow measuring means, end said nozzle assembly means;

(j) an enclosed cylindrical pressure vessel means having a tangentially disposed liquid stream vessel inlet means connected to said inlet pipe means for delivering said recycled liquid stream into said cylindrical pressure vessel means; said pump means, said nozzle assembly means and said inlet pipe means cooperating to feed the recycled liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means, a center gas dissolving tube and/or at least one wall-mounted gas dissolving plate assembly means for feeding at least a second and third gases into said pressure vessel means by gas compressor means and gas injector means, gas flow meter means and regulator means connected to the plural gas inlet means for regulating the pressure in said pressure vessel means to 2–7 atmospheres, and a vessel outlet means;

(k) at least one pressurized water release assembly means connected to the vessel outlet means of said pressure vessel means and positioned inside said open vessel means; said pressurized water release assembly means further comprising a pressure reduction valve for allowing said recycled liquid stream to be depressurized in stages under laminar flow conditions for generation of micro gas bubbles with diameter less than 80 microns in the depressurized liquid stream inside said open vessel means;

(l) said open vessel means connected directly or indirectly to said bioreactor means for receiving both the bioreactor effluent liquid stream from the bioreactor means and the depressurized liquid stream from the pressurized water release assembly means and holding the depressurized liquid stream containing said micro gas bubbles sufficiently long so that a floating scum layer forms on the free surface of the liquid and a subnatant forms below the floating scum;

(m) a second discharge means connected to said open vessel means to discharge said subnatant as said clarified effluent liquid stream;

(n) means connected to said open vessel means, including said inlet pipe means, for recycling a portion of said effluent from the second discharge means to the pressure vessel means and defining said recycled liquid stream;

(o) sludge removal means connected to said open vessel means for collection and removal of said floating scum on the liquid surface of said open vessel means and collection of settled sludges near bottom of said open vessel means;

(p) means for controlling the on/off operation of said pump means;

(g) gas compressor means connected to said pressure vessel means and said bubbles distribution means for supplying gas;

(r) means including said sludge removal means, connected to said open vessel means for recycling a portion of said floating scum, settled sludges, or both, containing microorganisms to said bioreactor means;

(s) post-treatment means connected to said open vessel means for further treating said clarified effluent liquid stream and producing a post-treated effluent liquid stream; and (t) a third discharge means to discharge said post-treated effluent liquid stream.

23. An apparatus for dissolving a plurality of gases into a recycled liquid stream by pressurization, releasing the pressurized recycled liquid stream containing said dissolved gases to a reduced pressure, generating micro gas bubbles in a depressurized liquid stream, concentrating microorganisms as a floating scum on the surface of said depressurized liquid stream, recycling a portion of said concentrated microorganisms is the floating scum to an influent liquid stream for treating said influent liquid stream, and discharging a clarified effluent liquid stream comprising:

(a) an influent pipe means and a liquid flow measuring means connected to the influent pipe means for measuring the flow of an influent liquid stream;

(b) a pretreatment chamber means directly or indirectly connected to said influent pipe means comprising feeder means for feeding chemicals and/or microorganisms into said influent liquid stream, separation modules means located in said pretreatment chamber means for removing oil and suspended solids from said influent liquid stream, and a first discharge means for discharging a pretreated effluent liquid stream;

(c) a bioreactor means connected to said pretreatment chamber means for receiving and treating said pretreated effluent liquid stream is the presence of microorganisms, organisms and dissolved gas and producing a bioreactor effluent liquid stream and a waste gas stream; said bioreactor means further comprising means for delivering at least one gas to said bioreactor means;

(d) said means for delivering at least one gas comprises a bubbles distribution means positioned near bottom of said bioreactor means for generating coarse gas bubbles with diameter greater than 80 microns;

(e) means positioned inside said bioreactor means for holding microorganisms or organisms to be attached;

(f) means connected to said bioreactor means for discharging said bioreactor effluent liquid stream;

(g) means connected to said bioreactor means for receiving the recycled floating scum or settled sludges or both containing microorganisms;

(h) an inlet pipe means connected to a nozzle assembly means for feeding said recycled liquid stream, another liquid flow measuring means connected to the inlet pipe means for measuring the flow of said recycled liquid stream, gas injector means connected to said inlet pipe means for feeding a first gas into said recycled liquid stream, pump means connected to said inlet pipe means for forcing said recycled liquid stream through said gas injector means, said another liquid flow measuring means, and said nozzle assembly means;

(i) an enclosed cylindrical pressure vessel means having a tangentially disposed liquid stream vessel inlet means connected to said inlet pipe means for delivering said recycled liquid stream into said cylindrical pressure vessel means; said pump means, said nozzle assembly means and said inlet pipe means cooperating to feed the recycled liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means, a center gas dissolving tube and/or at least one well-mounted gas dissolving plate assembly for feeding at least a second and third gases into said pressure vessel means, gas flow meter means and regulator means connected to the plural gas inlet means for regulating the pressure in said pressure vessel means to 2–7 atmospheres, and a vessel outlet means;

(j) at least one pressurized water release assembly means connected to the vessel outlet means of said pressure vessel means and positioned inside an open vessel means; said pressurized water release assembly means further comprising a pressure reduction valve for allowing said recycled liquid stream to be depressurized in stages under laminar flow conditions for generation of micro gas bubbles with diameter less than 80 microns in the depressurized liquid stream inside said open vessel means;

(k) said open vessel means connected directly or indirectly to said bioreactor means for receiving both the bioreactor effluent liquid stream from the bioreactor means and the depressurized liquid stream from the pressurized water release assembly means and for holding the depressurized liquid stream containing said micro gas bubbles sufficiently long so that a floating scum layer forms on the free surface of the liquid and a subnatant forms below the floating scum; a second discharge means to discharge said subnatant as said clarified effluent liquid stream; means, including said inlet pipe means, for recycling a portion of said effluent from the second discharge means to the pressure vessel means and defining said recycled liquid stream; sludge removal means for collecting and removing said floating scum on the liquid surface of said open vessel means and collecting settled sludges near bottom of said open vessel means;

(l) means including said sludge removal means connected to said open vessel means for recycling a portion of said floating scum and/or settled sludge containing microorganisms to said bioreactor means;

(m) post-treatment means connected to said open vessel means for further treating said clarified effluent liquid stream and producing a post-treated effluent liquid stream; and (n) a third discharge means to discharge said post-treated effluent liquid stream.

* * * * *